US012712286B2

(12) United States Patent
Jong et al.

(10) Patent No.: US 12,712,286 B2
(45) Date of Patent: Aug. 18, 2026

(54) ELECTRONIC DEVICE COMPRISING HOLE THROUGH WHICH SIGNAL HAVING POLARIZATION PASSES

(71) Applicant: Samsung Electronics Co., Ltd., Suwon-si (KR)

(72) Inventors: Jehun Jong, Suwon-si (KR); Hosaeng Kim, Suwon-si (KR); Seongjin Park, Suwon-si (KR); Keumsu Song, Suwon-si (KR); Sumin Yun, Suwon-si (KR); Jaehoon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/758,693

(22) Filed: Jun. 28, 2024

(65) Prior Publication Data

US 2024/0356239 A1 Oct. 24, 2024

Related U.S. Application Data

(63) Continuation of application No. PCT/KR2022/021758, filed on Dec. 30, 2022.

(30) Foreign Application Priority Data

Dec. 31, 2021 (KR) ........................ 10-2021-0194353
Feb. 8, 2022 (KR) ........................ 10-2022-0016028

(51) Int. Cl.
*H01Q 1/24* (2006.01)
*H01Q 21/24* (2006.01)
*H01Q 21/30* (2006.01)

(52) U.S. Cl.
CPC .......... *H01Q 21/245* (2013.01); *H01Q 1/243* (2013.01); *H01Q 21/30* (2013.01)

(58) Field of Classification Search
CPC .......... H01Q 1/24; H01Q 1/241; H01Q 1/243; H01Q 1/2291; H01Q 19/005; H01Q 19/22; H01Q 21/24; H01Q 21/245; H01Q 21/30
See application file for complete search history.

(56) References Cited

U.S. PATENT DOCUMENTS 8,674,895 B2 3/2014 Timofeev
9,300,024 B2 3/2016 Schuppener et al.
(Continued)

FOREIGN PATENT DOCUMENTS

CN 113594687 A 11/2021
KR 10-2018-0011775 A 2/2018
(Continued)

OTHER PUBLICATIONS

Extended European Search Report dated Mar. 3, 2025 issued in European Patent Application No. 22916852.1.
(Continued)

*Primary Examiner* — Thai Pham
(74) *Attorney, Agent, or Firm* — Nixon & Vanderhye P.C.

(57) ABSTRACT

An electronic device, according to an embodiment, may comprise: a housing including a front plate, a rear plate oriented in a direction opposite to the front plate, and a side bezel surrounding a space between the front plate and the rear plate; a hole formed on the side bezel; an antenna module comprising a substrate disposed inside the housing and spaced apart from the hole, and a first conductive member comprising a conductive material disposed on a surface of the substrate facing the hole and configured to emit a signal having first polarization or second polarization; and a second conductive member comprising a conductive
(Continued)

530: 500A, 500B, 500C material disposed on a non-conductive member while facing the first conductive member, and coupled to the first conductive member.

20 Claims, 21 Drawing Sheets

(56) References Cited

U.S. PATENT DOCUMENTS

| | | | | |
|---|---|---|---|---|
| 10,224,643 | B2 | 3/2019 | Moon et al. | |
| 10,361,476 | B2 | 7/2019 | Ou | |
| 10,727,600 | B1 | 7/2020 | Saeidi et al. | |
| 11,056,788 | B2 | 7/2021 | Mcgough et al. | |
| 11,502,413 | B2 | 11/2022 | Park et al. | |
| 11,641,061 | B2 | 5/2023 | Paulotto et al. | |
| 11,831,072 | B2 | 11/2023 | Park et al. | |
| 2015/0171522 | A1 | 6/2015 | Liu et al. | |
| 2017/0309991 | A1* | 10/2017 | Noori | H01Q 1/2258 |
| 2018/0233808 | A1* | 8/2018 | Noori | H01Q 1/241 |
| 2020/0212584 | A1* | 7/2020 | Park | H01Q 13/16 |
| 2021/0320420 | A1* | 10/2021 | Park | H01Q 21/064 |
| 2021/0400802 | A1 | 12/2021 | Kim et al. | |
| 2022/0376380 | A1 | 11/2022 | Park et al. | |
| 2023/0011271 | A1 | 1/2023 | Lin et al. | |

FOREIGN PATENT DOCUMENTS

| | | | |
|---|---|---|---|
| KR | 20190048729 | A | 5/2019 |
| KR | 102001519 | B1 | 7/2019 |
| KR | 20200057962 | A | 5/2020 |
| KR | 10-2020-0081760 | A | 7/2020 |
| KR | 20200105395 | A | 9/2020 |
| KR | 10-2021-0063763 | A | 6/2021 |
| KR | 20210101781 | A | 8/2021 |
| KR | 102557031 | B1 | 7/2023 |

OTHER PUBLICATIONS

Korean Office Action dated Feb. 26, 2026 for KR Application No. 10-2022-0016028.

Qi Xin et al., "A Novel Dual-Band Yagi-Uda Antenna for Wireless Communications", National Key Laboratory of Antenna and Microwave Technology, Xidian University, downloaded Jul. 23, 2021, pp. 289-292.

International Search Report for PCT/KR2022/021758, mailed Apr. 7, 2023, 5 pages.

Written Opinion of the ISA for PCT/KR2022/021758, mailed Apr. 7, 2023, 5 pages.

* cited by examiner

530: 500A, 500B, 500C

603: 603-1, 603-2, 603-3, 603-4, 603-5
612: 612-1, 612-2, 612-3, 612-4, 612-5

ELECTRONIC DEVICE COMPRISING HOLE THROUGH WHICH SIGNAL HAVING POLARIZATION PASSES

CROSS-REFERENCE TO RELATED APPLICATIONS

This application is a International Application No. PCT/KR2022/021758 designating the United States, filed on Dec. 30, 2022, in the Korean Intellectual Property Receiving Office and claiming priority to Korean Patent Application Nos. 10-2021-0194353, filed on Dec. 31, 2021, and 10-2022-0016028, filed on Feb. 8, 2022, in the Korean Intellectual Property Office, the disclosures of each of which are incorporated by reference herein in their entireties.

BACKGROUND

Field

The disclosure relates to an electronic device comprising a hole through which a signal having polarization passes.

Description of Related Art

According to the development of communication devices, an electronic device may include antenna modules capable of fast and high-capacity transmission, for the production and transmission of various contents, Internet connection with various objects (e.g., Internet of Things (IoT)), or communication connection between various sensors for autonomous driving. For example, the electronic device may include an antenna module (hereinafter, mmWave antenna module) that radiates a mmWave signal.

The mmWave antenna module may be disposed adjacent to an outer periphery of a frame forming a side of the electronic device. For example, an electronic device may include mmWave antenna modules disposed adjacent to a side of the electronic device and forming a beam toward the side.

Among housing structures of an electronic device, a side bezel structure forming a side of the electronic device may include a hole provided for an antenna module to radiate a mmWave signal. In order for a signal having characteristics of a first polarization or a second polarization different from the first polarization among mmWave signals radiated by the antenna module to pass through an opening, a length of a line segment passing through a center of the hole may be greater than a length of a half wavelength of the mmWave signal. However, according to a recent trend of thinning electronic devices, the electronic device may have difficulty securing a sufficient length of the line segment for passing the mmWave signal.

SUMMARY

Embodiments of the disclosure may provide an electronic device that may include a structure that guides a beam radiated from an antenna module to pass through a hole in which a length of a line segment passing through a center of the hole is less than a length of a half wavelength.

According to an example embodiment, an electronic device may comprise: a housing including, a front plate, a rear plate facing in an opposite direction to the front plate, and a side bezel surrounding a space between the front plate and the rear plate, a hole formed at the side bezel, a non-conductive member comprising a non-conductive material filling the hole, an antenna module including a substrate in the housing spaced apart from the hole, and a first conductive member comprising a conductive material disposed on a surface of the substrate facing the hole, and configured to radiate a signal with a first polarization or a second polarization, a second conductive member comprising a conductive material facing the first conductive member and disposed at the non-conductive member, the second conductive member being parallel to a polarization direction of the first polarization and coupled to the first conductive member, a third conductive member comprising a conductive material disposed at the non-conductive member and spaced apart from an end of the second conductive member, a fourth conductive member comprising a conductive material disposed at the non-conductive member and spaced apart from another end of the second conductive member, and at least one processor, comprising processing circuitry, operably coupled to the first conductive member. According to an example embodiment, at least one processor, individually and/or collectively, may be configured to communicate a signal of a first frequency band with an external electronic device distinct from the electronic device through the first conductive member and the second conductive member, and communicate a signal of a second frequency band lower than the first frequency band with an external electronic device distinct from the electronic device through the first conductive member, the second conductive member, the third conductive member coupled to the second conductive member, and the fourth conductive member coupled to the second conductive member.

According to an example embodiment, an electronic device may comprise: a housing including, a front plate, a rear plate facing in an opposite direction to the front plate, and a side bezel surrounding a space between the front plate and the rear plate, a hole formed at the side bezel, a non-conductive member comprising a non-conductive material filling the hole, an antenna module including a substrate in the housing spaced apart from the hole, and a first conductive member comprising a conductive material disposed on a surface of the substrate facing the hole, a second conductive member comprising a conductive material facing the first conductive member and disposed at the non-conductive member, the second conductive member being coupled to the first conductive member, and at least one processor, comprising processing circuitry, operably coupled to the first conductive member of the first conductive member and the second conductive member, wherein at least one processor, individually and/or collectively, may be configured to communicate with an external electronic device distinct from the electronic device, through the first conductive member and the second conductive member.

According to an example embodiment, an electronic device can reduce a size of a hole formed in a surface of the electronic device for passing through a RF signal transmitted and/or received by a wireless communication circuit.

The effects that can be obtained from the present disclosure are not limited to those described above, and any other effects not mentioned herein will be clearly understood by those having ordinary knowledge in the art to which the present disclosure belongs, from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
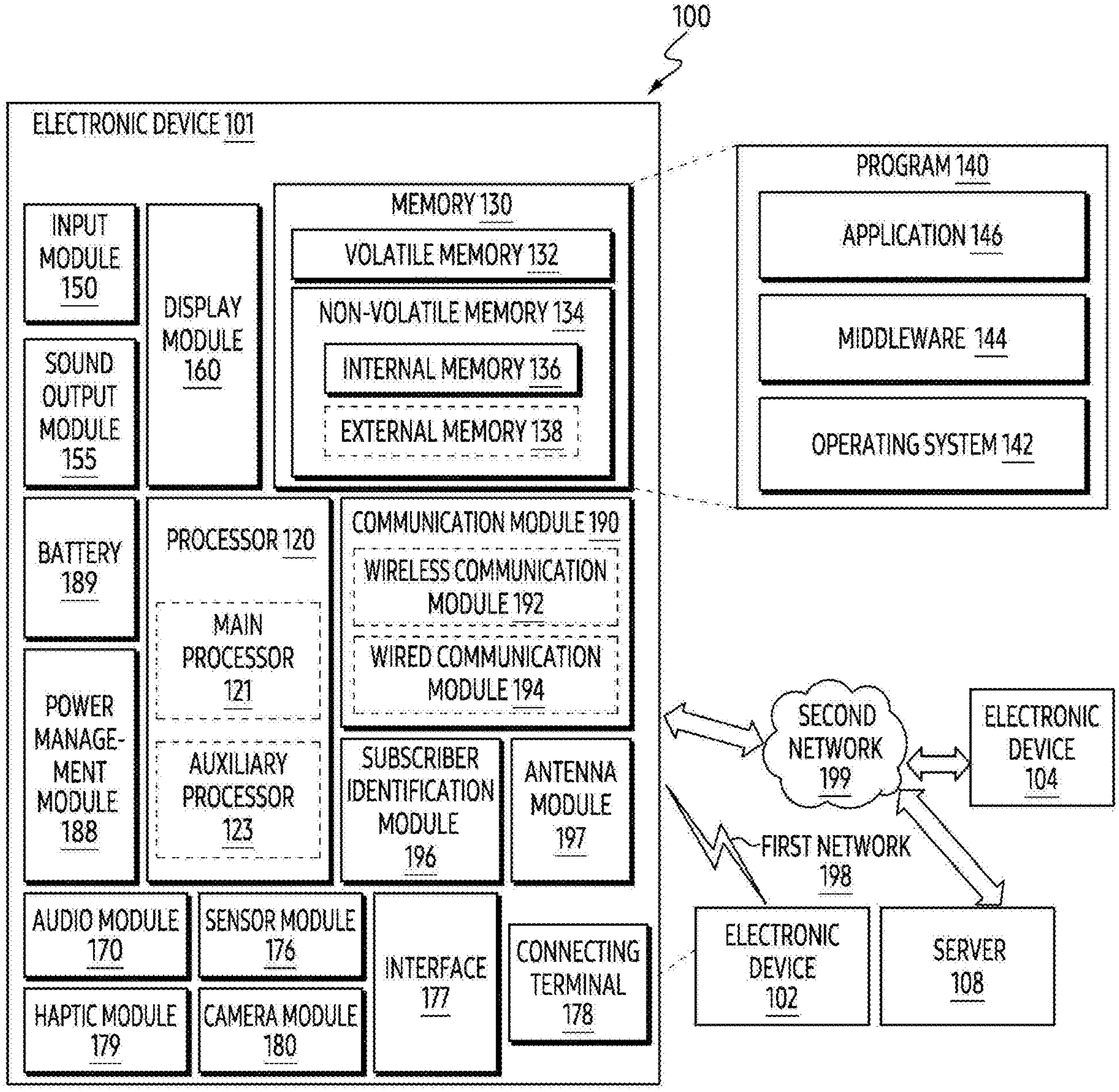
FIG. 1 is a diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
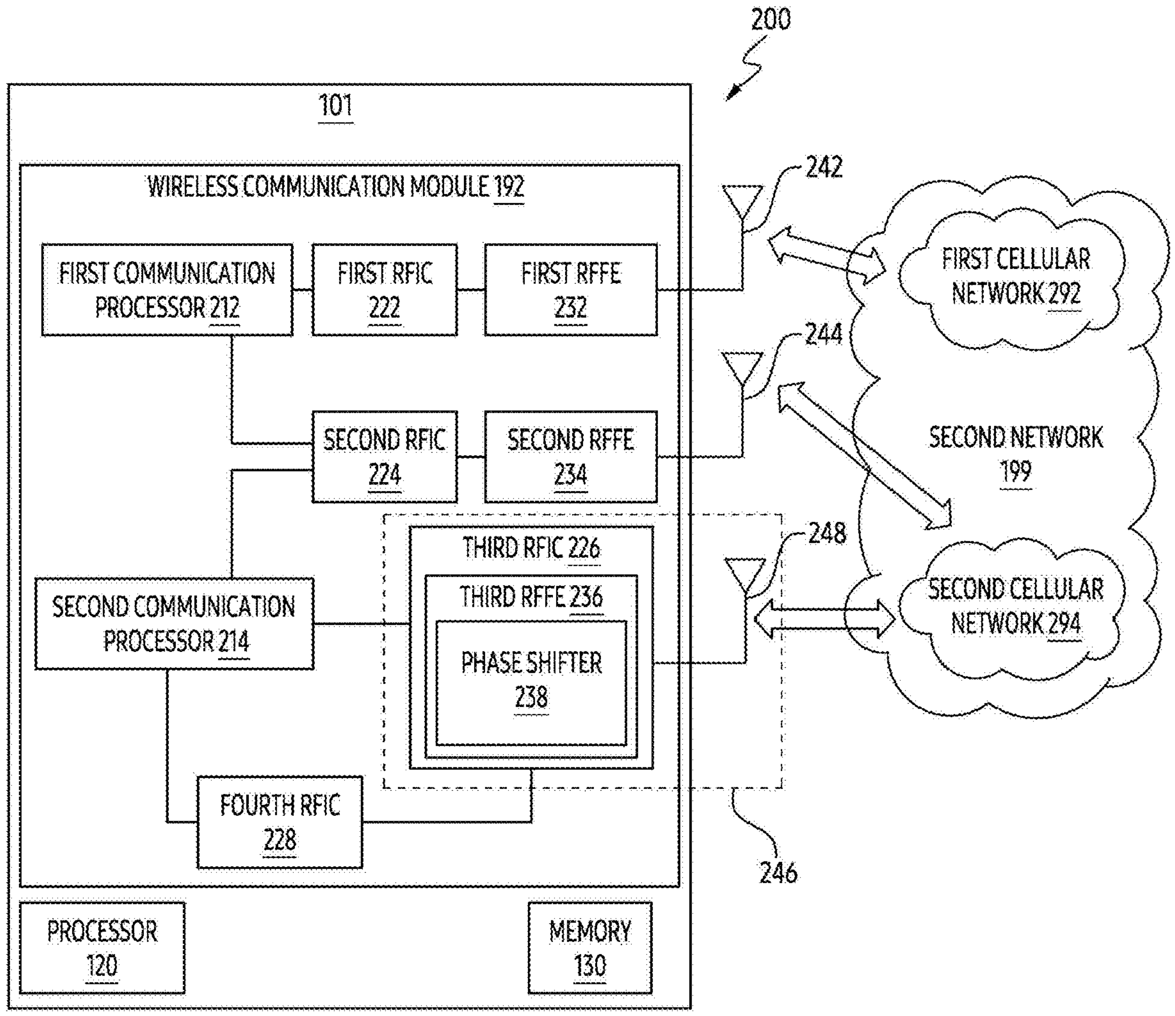
FIG. 2 is a block diagram illustrating an example configuration of an electronic device for supporting legacy network communication and 5G network communication according to various embodiments.

FIG. 2 is a diagram illustrating an example configuration of an electronic device 101 for supporting legacy network communication and 5G network communication according to various embodiments.

Referring to FIG. 2, the electronic device 101 may further include a first communication processor (e.g., including processing circuitry) 212, a second communication processor (e.g., including processing circuitry) 214, a first RFIC 222, a second RFIC 224, a third RFIC 226, a fourth RFIC 228, a first radio frequency front end (RFFE) 232, a second RFFE 234, a first antenna module (e.g., including at least one antenna) 242, a second antenna module (e.g., including at least one antenna) 244, and an antenna 248. The electronic device 101 may further include a processor (e.g., including processing circuitry) 120 and a memory 130. The network 199 may include a first network 292 and a second network 294. The electronic device 101 may further include at least one of the components shown in FIG. 1, and the network 199 may further include at least another network. The first communication processor 212, the second communication processor 214, the first RFIC 222, the second RFIC 224, the fourth RFIC 228, the first RFFE 232, and the second RFFE 234 may include at least a part of the wireless communication module 192. The fourth RFIC 228 may be omitted, or may be included as a part of the third RFIC 226.

The first communication processor 212 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The first communication processor 212 may, for example, establish a communication channel in a band to be used for wireless communication with a first network 292, and may support legacy network communication through the established communication channel. The first network may be a legacy network including a second generation (2G), third generation (3G), fourth generation (4G), or long-term evolution (LTE) network. The second communication processor 214 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The second communication processor 214 may, for example, establish a communication channel corresponding to a designated band (e.g. from about 6 GHz to about 60 GHz) among bands to be used for wireless communication with a second network 294, and may support 5G network communication through the established communication channel. The second network 294 may be a 5G network defined in the third generation partnership project (3GPP). Additionally, the first communication processor 212 or the second communication processor 214 may establish a communication channel corresponding to another designated band (e.g. about 6 GHz or less) among bands to be used for wireless communication with the second network 294, and may support 5G network communication through the established communication channel. The first communication processor 212 and the second communication processor 214 may be implemented in a single chip or a single package together with the processor 120, the auxiliary processor 123, or the communication module 190.

At the time of signal transmission, the first RFIC 222 may convert a baseband signal generated by the first communication processor 212 into a radio-frequency (RF) signal of about 700 megahertz (MHz) to about 3 GHz used for the first network 292 (e.g. a legacy network). At the time of signal reception, the RF signal may be acquired from the first network 292 (e.g. a legacy network) through an antenna (e.g. the first antenna module 242), and may be preprocessed through RFFE (e.g. the first RFFE 232). The first RFIC 222 may convert the preprocessed RF signal into a baseband signal which can be processed by the first communication processor 212.

At the time of signal transmission, the second RFIC 224 may convert a baseband signal generated by the first communication processor 212 or the second communication processor 214 into an RF signal (hereinafter, a 5G Sub6 RF signal) of a Sub6 band (e.g. about 6 GHz or less) used for the second network 294 (e.g. a 5G network). At the time of signal reception, the 5G Sub6 RF signal may be acquired from the second network 294 (e.g. a 5G network) through an antenna (e.g. the second antenna module 244), and may be preprocessed through RFFE (e.g. the second RFFE 234). The second RFIC 224 may convert the preprocessed 5G Sub6 RF signal into a baseband signal which can be processed by a corresponding communication processor among the first communication processor 212 and the second communication processor 214.

The third RFIC 226 may convert a baseband signal generated by the second communication processor 214 into an RF signal (hereinafter, a 5G Above6 RF signal) of a 5G Above6 band (e.g. from about 6 GHz to about 60 GHz) to be used in the second network 294 (e.g. a 5G network). At the time of signal reception, the 5G Above6 RF signal may be acquired from the second network 294 (e.g. a 5G network) through an antenna (e.g. the antenna 248), and may be preprocessed through the third RFFE 236. The third RFIC 226 may convert the preprocessed 5G Above6 RF signal into a baseband signal that can be processed by the second communication processor 214. The third RFFE 236 may be configured as a part of the third RFIC 226.

226 or as at least a part thereof. In this instance, the fourth RFIC 228 may convert a baseband signal generated by the second communication processor 214 into an RF signal (hereinafter, an intermediate-frequency (IF) signal) of an intermediate frequency band (e.g. from about 9 GHz to about 11 GHz) and may then transmit the IF signal to the third RFIC 226. The third RFIC 226 may convert the IF signal into a 5G Above6 RF signal. At the time of signal reception, the 5G Above6 RF signal may be received from the second network 294 (e.g. a 5G network) through an antenna (e.g. the antenna 248) and may be converted into an IF signal by the third RFIC 226. The fourth RFIC 228 may convert the IF signal into a baseband signal that can be processed by the second communication processor 214.

The first RFIC 222 and second RFIC 224 may be implemented as at least a part of a single package or a single chip. The first RFFE 232 and the second RFFE 234 may be implemented as at least a part of a single package or a single chip. At least one antenna module of the first antenna module 242 or the second antenna module 244 may be omitted, or may be combined with the other antenna module to process RF signals of multiple bands corresponding thereto.

The third RFIC 226 and antenna 248 may be arranged on the same substrate to comprise a third antenna module 246. For example, the wireless communication module 192 or the processor 120 may be arranged on a first substrate (e.g. a main PCB). In this instance, the third antenna module 246 may be configured by arranging the third RFIC 226 in a partial area (e.g. a lower surface) of a second substrate (e.g. a sub PCB) independent of the first substrate and arranging the antenna 248 in another partial area (e.g. an upper surface) thereof. Arranging the third RFIC 226 and the antenna 248 on the same substrate can reduce the length of a transmission line therebetween, and may reduce the loss (e.g. attenuation) of a signal in a high-frequency band (e.g. about 6 GH-about 60 GHz), used for 5G network communication, by a transmission line. Therefore, the electronic device 101 may exhibit an enhanced quality or speed of communication with the second network 294 (e.g. a 5G network). The antenna 248 may be configured as an antenna array including multiple antenna elements which can be used for beamforming. In this instance, the third RFIC 226 may include, as a part of the third RFFE 236, multiple phase shifters 238 corresponding to the multiple antenna elements. At the time of signal transmission, the multiple phase shifters 238 may shift the phases of 5G Above6 RF signals to be transmitted from the electronic device 101 to an external device (e.g. a base station of a 5G network) through antenna elements corresponding thereto. At the time of signal reception, the multiple phase shifters 238 may shift the phases of 5G Above6 RF signals received from the outside through antenna elements corresponding thereto into an identical or substantially identical phase, thus enabling the transmission or reception through beamforming between the electronic device 101 and the outside.

The second network 294 (e.g. a 5G network) may be operated independently of the first network 292 (e.g. a legacy network) (e.g. stand-alone (SA)) or may be operated while being connected to the first network (e.g. non-stand-alone (NSA)). For example, the 5G network may include only an access network (e.g. a 5G radio access network (RAN) or next-generation RAN (NG RAN)) and may not include a core network (e.g. a next-generation core (NGC)). In this instance, the electronic device 101 may access an access network of a 5G network and may then access an external network (e.g. Internet) under the control of a core network (e.g. an evolved packed core (EPC) network) of a legacy network. Protocol information (e.g. LTE protocol information) for communication with the legacy network or protocol information (e.g. new radio (NR) protocol information) for communication with the 5G network are stored in a memory 230, and may be accessed by another component (e.g. the processor 120, the first communication processor 212, or the second communication processor 214).

Figure 3:
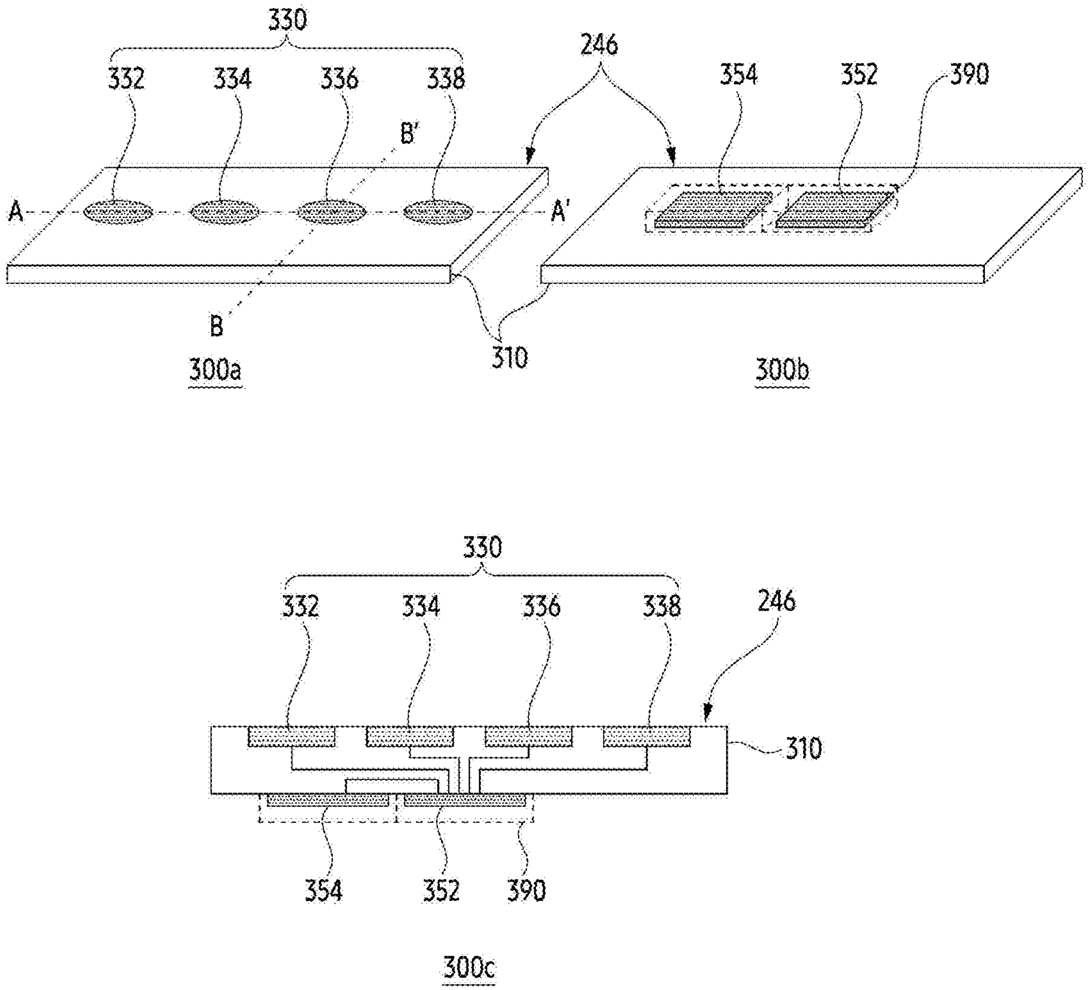
FIG. 3 is a diagram illustrating an example structure of a third antenna module described with reference to FIG. 2 according to various embodiments.

FIG. 3 is a diagram illustrating an example structure of the third antenna module 246 described with reference to FIG. 2 according to various embodiments. 300*a* of FIG. 3 is a perspective view of the third antenna module 246 as viewed from one side, and 300*b* of FIG. 3 is a perspective view of the third antenna module 246 as viewed from the other side. 300*c* of FIG. 3 is a cross-sectional view of A-A' of the third antenna module 246.

Referring to FIG. 3, in an embodiment, the third antenna module 246 may include a printed circuit board 310, an antenna array 330, a radio frequency integrated circuit (RFIC) 352, and a power manage integrated circuit (PMIC) 354, and a module interface (not shown). The third antenna module 246 may further optionally include a shielding member 390. In various embodiments, at least one of the aforementioned parts may be omitted, or at least two of the parts may be integrally formed.

The printed circuit board 310 may include a plurality of conductive layers and a plurality of non-conductive layers alternately stacked with the conductive layers. The printed circuit board 310 may provide electrical connection between various electronic components disposed on the printed circuit board 310 and/or outside, using wires and conductive vias formed on the conductive layer.

The antenna array 330 (e.g., 248 in FIG. 2) may include a plurality of antenna elements 332, 334, 336, and 338 arranged to form a directional beam. The antenna elements may be formed on a first surface of the printed circuit board 410 as illustrated. According to an embodiment, the antenna array 330 may be formed inside the printed circuit board 310. According to embodiments, the antenna array 330 may include a plurality of antenna arrays (e.g., a dipole antenna array and/or a patch antenna array) of the same or different shape or type.

The RFIC 352 (e.g., the third RFIC 226 in FIG. 2) may be disposed in another region of the printed circuit board 310 (e.g., a second surface opposite to the first surface), spaced apart from the antenna array 330. The RFIC 352 may be configured to process a signal of a selected frequency band that is transmitted and received via the antenna array 330. According to an embodiment, upon transmission, the RFIC 352 may convert a baseband signal obtained from a communication processor (not illustrated) into an RF signal of a specified band. Upon reception, the RFIC 352 may convert an RF signal received via the antenna array 330 into a baseband signal and transmit the converted signal to the communication processor.

According to an embodiment, upon transmission, the RFIC 352 may up-convert an IF signal (e.g., approximately 7 GHz to approximately 13 GHz) obtained from an intermediate frequency integrated circuit (IFIC) (e.g., the fourth RFIC 228 in FIG. 2) into the RF signal of the selected band. Upon reception, the RFIC 352 may down-convert the RF signal obtained via the antenna array 330 into an IF signal, and transmit the converted signal to the IFIC.

The PMIC 354 may be disposed in another partial region (e.g., the second surface) of the printed circuit board 310, spaced apart from the antenna array. The PMIC 354 may receive a voltage from a main PCB (not shown) and provide power required for various components (e.g., the RFIC 352) on antenna modules.

The shielding member 390 may be disposed on a part (e.g., the second surface) of the printed circuit board 310 in order to electromagnetically shield at least one of the RFIC 352 and the PMIC 354. According to an embodiment, the shielding member 390 may include a shield can.

Although not illustrated, in various embodiments, the third antenna module 246 may be electrically connected to another printed circuit board (e.g., the main circuit board) through the module interface. The module interface may include a connection member, for example, a coaxial cable connector, a board to board connector, an interposer, or a flexible printed circuit board (FPCB). Using the connection member, the RFIC 352 and/or the PMIC 354 of the third antenna module.

Figure 4:
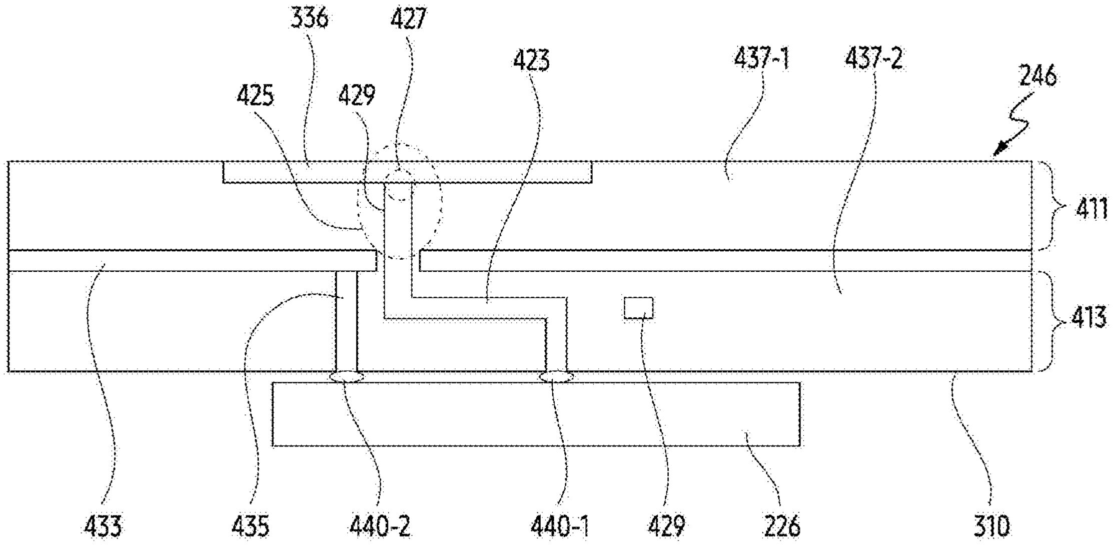
FIG. 4 is a cross-sectional view of a third antenna module of FIG. 3 taken along line B-B' according to various embodiments.

FIG. 4 is a cross-sectional view taken along line B-B' of the third antenna module 246 of 300*a* of FIG. 3 according to various embodiments. A printed circuit board 310 of the illustrated embodiment may include an antenna layer 411 and a network layer 413.

The antenna layer 411 may include at least one dielectric layer 437-1, and an antenna element 336 and/or a feeding unit 425 formed on the outer surface of or inside of the dielectric layer. The feeding unit 425 may include a feeding point 427 and/or a feeding line 429.

The network layer 413 may include at least one dielectric layer 437-2, at least one ground layer 433 formed on the outer surface of or inside of the dielectric layer, at least one conductive via 435, a transmission line 423, and/or a signal line 426.

In addition, in the illustrated embodiment, the third RFIC 226 of 300*c* of FIG. 3 may be electrically connected to the network layer 413, for example, through first and second connecting portions (solder bumps) 440-1 and 440-2. In various embodiments, various connecting structures (e.g., solder or ball grid array (BGA)) may be used instead of the connecting portions. The third RFIC 226 may be electrically connected to the antenna element 336 via a first connecting portion 440-1, the transmission line 423, and the feeding unit 425. The third RFIC 226 may also be electrically connected to the ground layer 433 via the second connecting portion 440-2 and the conductive via 435.

Figure 5:
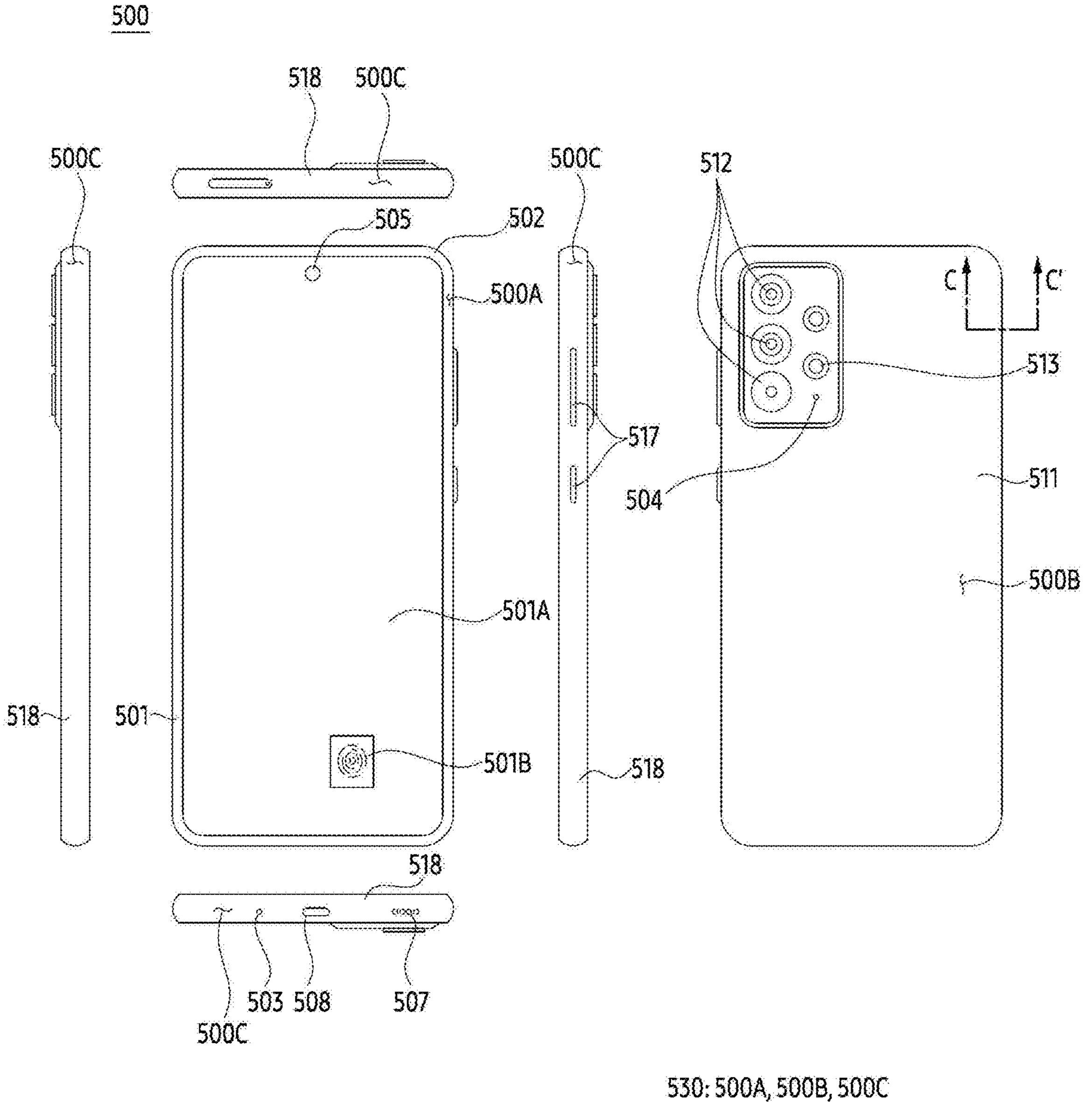
FIG. 5 is a diagram illustrating an example electronic device according to various embodiments.

FIG. 5 is a diagram illustrating an example electronic device according to various embodiments.

Referring to FIG. 5, an electronic device 500 according to an embodiment may include a housing 530 forming the exterior of the electronic device 500. For example, the housing 530 may include a first surface (or front surface) 500A, a second surface (or rear surface) 500B, and a third surface (or side surface) 500C surrounding a space between the first surface 500A and the second surface 500B. In an embodiment, the housing 530 may refer to a structure (e.g., the frame structure 540 of FIG. 2) forming at least a portion of the first surface 500A, the second surface 500B, and/or the third surface 500C.

The electronic device 500 according to an embodiment may include a substantially transparent front plate 502. In an embodiment, the front plate 502 may form at least a portion of the first surface 500A. In an embodiment, the front plate 502 may include, for example, a glass plate or a polymer plate including various coating layers, but is not limited thereto.

The electronic device 500 according to an embodiment may include a substantially opaque rear plate 511. In an embodiment, the rear plate 511 may form at least a portion of the second surface 500B. In an embodiment, the rear plate 511 may be formed from coated or colored glass, ceramic, polymer, metal (e.g., aluminum, stainless steel (STS), or magnesium), or a combination of at least two of these materials.

The electronic device 500 according to an embodiment may include a side bezel structure 518. In an embodiment, the side bezel structure 518 may be coupled to the front plate 502 and/or the rear plate 511 to form at least a portion of the third surface 500C of the electronic device 500. For example, the side bezel structure 518 may entirely form the third surface 500C of the electronic device 500, and for another example, the side bezel structure 518 may form the third surface 500C of the electronic device 500 together with the front plate 502 and/or the rear plate 511.

Unlike the illustrated embodiment, when the third surface 500C of the electronic device 500 is partially formed by the front plate 502 and/or the rear plate 511, the front plate 502 and/or the rear plate 511 may include an area that is bent toward the rear plate 511 and/or the front plate 502 at an edge thereof and extends seamlessly. For example, the extending area of the front plate 502 and/or the rear plate 511 may be located at both ends of a long edge of the electronic device 500, but it not limited by the described-above example.

In an embodiment, the side bezel structure 518 may include a metal and/or polymer. In an embodiment, the rear plate 511 and the side bezel structure 518 may be integrally formed, and may include the same material (e.g., a metallic material such as aluminum), but are not limited thereto. For example, the rear plate 511 and the side bezel structure 518 may be formed in separate configurations and/or may include different materials.

According to an embodiment, the electronic device 500 may include at least one of a display 501, an audio module 503, 504, and 507, a sensor module (not illustrated), a camera module 505, 512, and 513, a key input device 517, a light emitting element (not illustrated), and/or a connector hole 508. In an embodiment, the electronic device 500 may omit at least one of the components (e.g., the key input device 517 or the light emitting element (not illustrated)), or may additionally include another component.

In an embodiment, the display 501 (e.g., the display module 160 of FIG. 1) may be visible through a significant portion of the front plate 502. For example, at least a portion of the display 501 may be visible through the front plate 502 forming the first surface 500A. In an embodiment, the display 501 may be disposed on a rear surface of the front plate 502.

In an embodiment, an outer shape of the display 501 may be substantially the same as an outer shape of the front plate 502 adjacent to the display 501. In an embodiment, in order to increase an area in which the display 501 is visible, a distance between an outer periphery of the display 501 and an outer periphery of the front plate 502 may be formed substantially equal.

In an embodiment, the display 501 (or the first surface 500A of the electronic device 500) may include a screen display area 501A. In an embodiment, the display 501 may provide visual information to the user through the screen display area 501A. In the illustrated embodiment, when the first surface 500A is viewed from the front, the screen display area 501A is illustrated as being spaced apart from an outer periphery of the first surface 500A and located inside the first surface 500A, but is not limited thereto. In an embodiment, when the first surface 500A is viewed from the front, at least a portion of an edge of the screen display area 501A may substantially match with an edge of the first surface 500A (or the front plate 502).

In an embodiment, the screen display area 501A may include a sensing area 501B configured to obtain biometric information of a user. Herein, "the screen display area 501A includes the sensing area 501B" may be understood as at least a portion of the sensing area 501B capable of being overlapped with the screen display area 501A. For example, the sensing area 501B may refer, for example, to an area, which may display visual information by the display 501 and additionally obtain the user's biometric information (e.g., fingerprint), like other areas of the screen display area 501A. In an embodiment, the sensing area 501B may be formed at the key input device 517.

In an embodiment, the display 501 may include an area at which a first camera module 505 (e.g., the camera module 180 of FIG. 1) is located. In an embodiment, an opening is formed at the area of the display 501, and the first camera module 505 (e.g., a punch hole camera) may be at least partially disposed in the opening to face the first surface 500A. In this case, the screen display area 501A may surround at least a portion of an edge of the opening. In an embodiment, the first camera module 505 (e.g., an under display camera (UDC)) may be disposed below the display 501 to overlap the area of the display 501. In this case, the display 501 may provide visual information to the user through the area, and additionally, the first camera module 505 may obtain an image corresponding to a direction toward the first surface 500A through the area of the display 501.

In an embodiment, the display 501 may be coupled to or disposed adjacent to a touch sensing circuit, a pressure sensor capable of measuring the intensity (pressure) of a touch, and/or a digitizer detecting a magnetic field-type stylus pen.

In an embodiment, the audio modules 503, 504, and 507 (e.g., the audio module 170 of FIG. 1) may include a microphone hole 503 and 504 and a speaker hole 507.

In an embodiment, the microphone hole 503 and 504 may include a first microphone hole 503 formed in a partial area of the third surface 500C and a second microphone hole 504 formed in a partial area of the second surface 500B. A microphone (not illustrated) for obtaining an external sound may be disposed inside the microphone hole 503 and 504. The microphone may include a plurality of microphones to detect a direction of sound.

In an embodiment, the second microphone hole 504 formed in a partial area of the second surface 500B may be disposed adjacent to the camera modules 505, 512, and 513. For example, the second microphone hole 504 may obtain a sound according to an operation of the camera modules 505, 512, and 513. However, it is not limited thereto.

In an embodiment, the speaker hole 507 may include an external speaker hole 507 and a receiver hole for a call (not illustrated). The external speaker hole 507 may be formed in a portion of the third surface 500C of the electronic device 500. In an embodiment, the external speaker hole 507 may be implemented as a single hole with the microphone hole 503. Although not illustrated, the receiver hole for a call (not illustrated) may be formed in another portion of the third surface 500C. For example, the receiver hole for a call may be formed opposite to the external speaker hole 507, in the third surface 500C. For example, based on the illustration of FIG. 5, the external speaker hole 507 may be formed on a third surface 500C corresponding to a lower end of the electronic device 500, and the receiver hole for a call may be formed on a third surface 500C corresponding to an upper end of the electronic device 500. However, it is not limited thereto, and in an embodiment, the receiver hole for a call may be formed at a position other than the third surface 500C. For example, the receiver hole for a call may be formed by a spaced apart space between the front plate 502 (or the display 501) and the side bezel structure 518.

In an embodiment, the electronic device 500 may include at least one speaker (not illustrated) configured to output sound to the outside of the housing 530 through the external speaker hole 507 and/or the receiver hole for a call (not illustrated).

In an embodiment, the sensor module (not illustrated) (e.g., the sensor module 176 of FIG. 1) may generate an electrical signal or data value corresponding to an internal operation state of the electronic device 500 or an external environmental state. For example, the sensor module may include at least one of a proximity sensor, an HRM sensor, a fingerprint sensor, a gesture sensor, a gyro sensor, a pressure sensor, a magnetic sensor, an acceleration sensor, a grip sensor, a color sensor, an infrared (IR) sensor, a biometric sensor, a temperature sensor, a humidity sensor, or an illuminance sensor.

In an embodiment, the camera module 505, 512, and 513 (e.g., the camera module 180 of FIG. 1) may include a first camera module 505 disposed to face the first surface 500A of the electronic device 500, a second camera module 512 disposed to face the second surface 500B, and a flash 513.

In an embodiment, the second camera module 512 may include a plurality of cameras (e.g., a dual camera, a triple camera, or a quad camera). However, the second camera module 512 is not necessarily limited to including the plurality of cameras, and may include one camera.

In an embodiment, the first camera module 505 and the second camera module 512 may include one or more lenses, an image sensor, and/or an image signal processor.

In an embodiment, the flash 513 may include, for example, a light emitting diode or a xenon lamp. In an embodiment, two or more lenses (infrared camera, wide-angle and telephoto lens) and image sensors may be disposed on a surface of the electronic device 500.

In an embodiment, the key input device 517 (e.g., the input module 150 of FIG. 1) may be disposed on the third surface 500C of the electronic device 500. In an embodiment, the electronic device 500 may not include some or all of the key input devices 517, and the key input device 517 that is not included may be implemented in another form such as a soft key, on the display 501.

In an embodiment, the connector hole 508 may be formed on the third surface 500C of the electronic device 500 so that a connector of an external device may be accommodated therein. A connection terminal (e.g., the connecting terminal 178 of FIG. 1) electrically connected to the connector of the external device may be disposed in the connector hole 508. The electronic device 500 according to an embodiment may include an interface module (e.g., the interface 177 of FIG. 1) for processing an electrical signal transmitted and received through the connection terminal.

According to an embodiment, the electronic device 500 may include a light emitting element (not illustrated). For example, the light emitting element (not illustrated) may be disposed on the first surface 500A of the housing 530. The light emitting element (not illustrated) may provide state information of the electronic device 500 in an optical form. In an embodiment, the light emitting element (not illustrated) may provide a light source linked with an operation of the first camera module 505. For example, the light emitting element (not illustrated) may include an LED, an IR LED, and/or a xenon lamp.

In an embodiment, the housing 530 of the electronic device 500 may refer, for example, to a configuration or structure forming at least a portion of the exterior of the electronic device 500. In this regard, at least a portion of the front plate 502, the frame structure 540, and/or the rear plate 511 forming the exterior of the electronic device 500 may be referred to as the housing 530 of the electronic device 500.

Figure 6A:
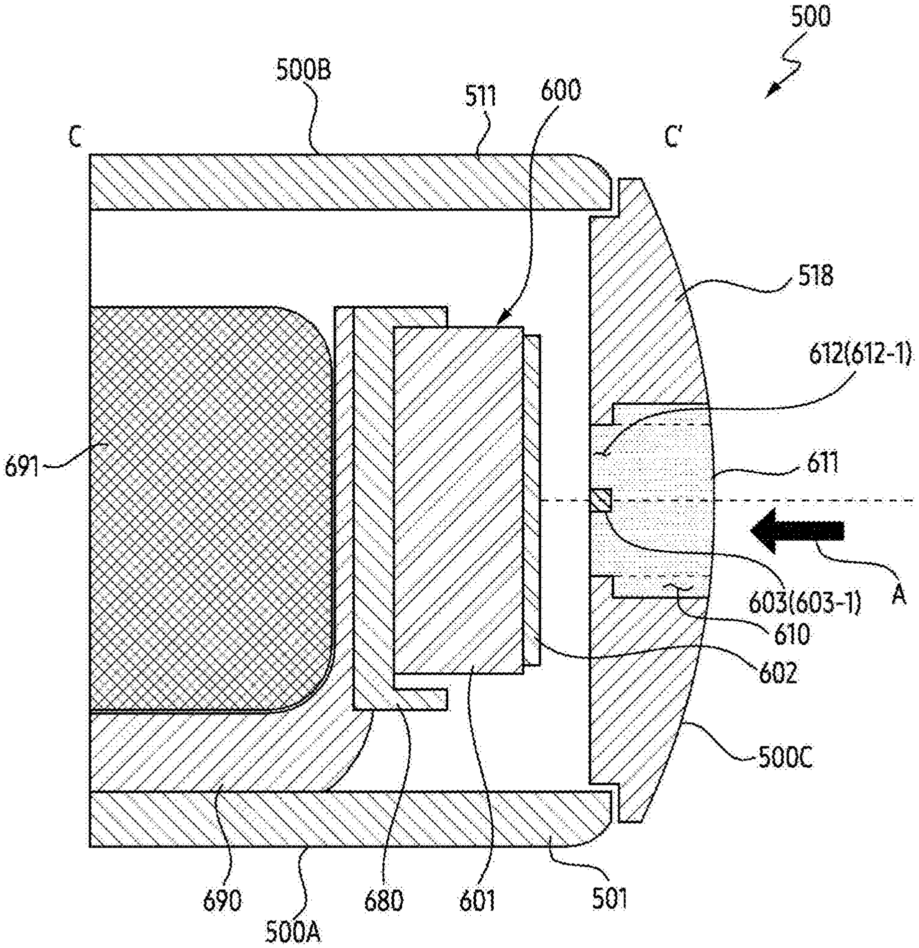
FIG. 6A is a cross-sectional view of an electronic device of FIG. 5 taken along line C-C' according to various embodiments.
Figure 6B:
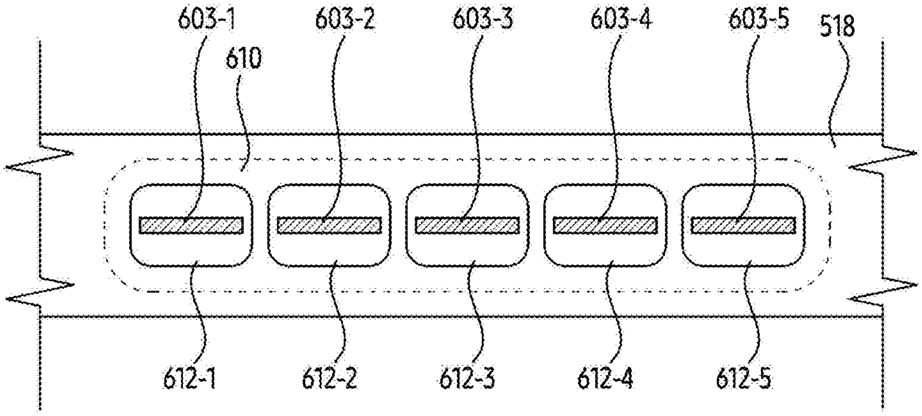
FIG. 6B is a diagram illustrating an example of a hole viewed from a side of a housing according to various embodiments.

FIG. 6A is a cross-sectional view of the electronic device of FIG. 5 taken along line C-C' according to various embodiments. FIG. 6B is a diagram illustrating an example of a hole viewed from a side of a housing according to various embodiments.

Referring to FIGS. 6A and 6B, an electronic device 500 may include a housing 530, an antenna module 600 including a first conductive member 602, a director 603, and a hole 612.

According to an embodiment, the housing 530 may include a display 501, a rear plate 511, and a side bezel structure 518. The display 501 may be referred to as a front plate. The display 501 may form a first surface 500A of the electronic device 500. The rear plate 511 may face in a direction opposite to the display 501. The rear plate 511 may form a second surface 500B of the electronic device 500. The side bezel structure 518 may be formed to surround a space between the display 501 and the rear plate 511. For example, the side bezel structure 518 between the display 501 and the rear plate 511 may be disposed along an edge of the display 501 and an edge of the rear plate 511 to form a third surface 500C of the electronic device 500.

According to an embodiment, the electronic device 500 may further include a support member 690. The support member 690 may be disposed in an inner space of the housing 530. In an embodiment, the support member 690 may be integrally formed with the side bezel structure 518 or may be disposed inside the housing 530. The support member 690 may support components of the electronic device 500. For example, the support member 690 may support a battery 691, the display 501, the antenna module 600, a camera and/or a printed circuit board.

According to an embodiment, the antenna module 600 may include a substrate 601 and the first conductive member 602. The antenna module 600 may further include an RFIC (e.g., the RFIC 352 of FIG. 3) or a PMIC (e.g., the PMIC 354 of FIG. 3) disposed on a surface of the substrate 601 opposite to a surface of the substrate 601 on which the first conductive member 602 is disposed. The substrate 601 may be electrically connected to at least one processor (e.g., the processor 120 of FIG. 1, the first communication processor 212 of FIG. 2, or the second communication processor 214). The first conductive member 602 may operate as an antenna radiator in which a signal received from the at least one processor and up converted by the RFIC is transmitted to the outside by forming a directional beam. The first conductive member 602 may receive a signal from the outside and transmit the signal down converted by the RFIC to the substrate 601.

According to an embodiment, the antenna module 600 may be supported by an antenna support unit 680 disposed on the support member 690. In an embodiment, the antenna module 600 may be disposed on the antenna support unit 680 to form a beam toward a side. The antenna module 600 may transmit electromagnetic wave to the outside or receive electromagnetic wave from the outside, through a hole 612 formed in the side bezel structure 518.

According to an embodiment, the side bezel structure 518 may include the hole 612. The hole 612 may penetrate the side bezel structure 518 from a third surface 500C (or outer surface) of the side bezel structure 518 toward an inner surface opposite to the third surface 500C of the side bezel structure 518. The hole 612 may be formed in an area corresponding to the first conductive member 602 of an antenna module 300. The first conductive member 602 may be referred to as an antenna element. The first conductive member 602 may transmit a signal to the outside through the hole 612. In order to transmit the signal, the hole 612 may be aligned with the first conductive member 602. The first conductive member 602 may include a plurality of conductive members (e.g., the plurality of antenna elements 332, 334, 336, or 338 of FIG. 3). The plurality of conductive members may be spaced apart from each other. The plurality of conductive members may form an antenna array (e.g., the antenna array 330 of FIG. 3), form a beam by combining signals radiated from the plurality of conductive members, and provide directionality of the beam.

According to an embodiment, the hole 612 may include a plurality of holes 612-1, 612-2, 612-3, 612-4, and 612-5. For example, the plurality of holes 612-1, 612-2, 612-3, 612-4, and 612-5 may include first to fifth holes 612-1, 612-2, 612-3, 612-4, and 612-5. In an embodiment, the number of the plurality of holes 612-1, 612-2, 612-3, 612-4, and 612-5 may correspond to the number of a plurality of conductive members included in the first conductive member 602. The plurality of holes 612-1, 612-2, 612-3, 612-4, and 612-5 may be spaced apart from each other. For example, the plurality of holes 612-1, 612-2, 612-3, 612-4, and 612-5 may be formed at positions corresponding one-to-one with the plurality of conductive members. In order to correspond to the plurality of conductive members spaced apart from each other, the plurality of holes 612-1, 612-2, 612-3, 612-4, and 612-5 may be spaced apart. The plurality of holes 612-1, 612-2, 612-3, 612-4, and 612-5 may be a path for transmitting beams radiated from the plurality of conductive members.

According to an embodiment, it is described that the hole 612 is disposed on the side bezel structure 518, but it is not limited thereto. For example, the hole 612 may be formed on a rear plate (e.g., the rear plate 511 of FIG. 5), and the first conductive member 602 of the antenna module 600 may radiate electromagnetic wave toward the rear plate 511. The hole 612 formed in the rear plate 511 may be a passage for transmitting electromagnetic wave radiated toward the rear plate 511.

According to an embodiment, the hole 612 may accommodate a non-conductive member 611. The non-conductive member 611 disposed in the hole 612 may be a dielectric. Electromagnetic wave radiated from the plurality of conductive members may pass through the hole 612 filled with the non-conductive member 611.

According to an embodiment, the director 603 may be disposed in the non-conductive member 611 filling the hole 612. For example, directors 603-1, 603-2, 603-3, 603-4, and 603-5 may be disposed in the non-conductive member 611 disposed in the holes 612-1, 612-2, 612-3, 612-4, and 612-5. For example, the directors 603-1, 603-2, 603-3, 603-4, and 603-5 may be disposed at positions corresponding one-to-one the plurality of holes 612-1, 612-2, 612-3, 612-4, and 612-5. The director 603 disposed in the non-conductive member 611 may radiate electromagnetic wave transmitted from the first conductive member 602 to the outside of the electronic device. The director 603 may guide electromagnetic wave having a first polarization, among electromagnetic waves transmitted from the first conductive member 602, into the hole 612. For example, when a signal with a first polarization does not pass through the hole, and a signal with a second polarization passes through the hole, among electromagnetic waves progressing toward the hole 612, due to a size of the hole 612, the director 603 may be arranged parallel to a polarization direction of the first polarization so that the signal with the first polarization is passed.

According to an embodiment, the director 603 may have a length shorter than a half wavelength of electromagnetic wave transmitted from the first conductive member 602, which is an antenna element. The director 603 may overlap with the hole 612 when looking at the side surface 500C in a direction A. The director 603 may be disposed on a surface of the non-conductive member 611 filling the hole 612 or may be disposed inside the non-conductive member 611. The director 603 disposed in the non-conductive member 611 may radiate electromagnetic wave with the first polarization transmitted to the director 603, so that electromagnetic wave passes through a hole narrower than half wavelength. The director 603 may maintain that a progress direction amplitude of electromagnetic wave transmitted from the first conductive member 602, which is an antenna element, does not widened. The director 603 may maintain the amplitude of electromagnetic wave progressing from the first conductive member 602 to a width capable of passing through the hole 612.

According to an embodiment, the electronic device 500 may further include a groove 610. The groove 610 may be formed in the side bezel structure 518 to surround the holes 612-1, 612-2, 612-3, 612-4, and 612-5. The groove 610 and the non-conductive member 611 filling the hole 612 may be integrally formed. In an embodiment, the groove 610 may be disposed in an area corresponding to the antenna module 600 of the side bezel structure 518. For example, when looking at the groove 610 of the side bezel structure 518 from the outside of the electronic device 500 in a direction A, the groove 610 may overlap with the antenna module 600. According to an embodiment, the groove 610 may be a form carved in a direction from an outer surface of the side bezel structure 518 toward the antenna module 300. The groove 610 may be connected to the hole 612. In an embodiment, a step may be formed at a connection portion between the groove 610 and the hole 612. According to an embodiment, the groove 610 may be omitted. For example, the holes 612-1, 612-2, 612-3, 612-4, and 612-5 may be formed to penetrate the side bezel structure 518. The holes 612-1, 612-2, 612-3, 612-4, and 612-5 may be spaced apart from each other. In an embodiment, the non-conductive member 611 may fill the hole 612 and the groove 610, and be integrally formed. The directors 603-1, 603-2, 603-3, 603-4, and 603-5 may be disposed in the holes 612-1, 612-2, 612-3, 612-4, and 612-5, respectively.

Although it is described that the director 603 is disposed in the hole 612, the director 603 may be disposed in the non-conductive member 611 filling the groove 610 in a progress direction of electromagnetic wave.

Although FIG. 6A illustrates that only one director 603-1 exists in the non-conductive member 611 filling the hole 612-1, the director 603-1 may include a plurality of conductive members. For example, in the director 603-1, the plurality of conductive members may be spaced apart from each other. Each of the plurality of conductive members may be spaced apart from each other in the non-conductive member 611 along a progress direction of electromagnetic wave. The electromagnetic wave transmitted to the director 603-1 may be guided to pass through the hole 612-1 via each of the plurality of conductive members.

According to an embodiment, the electronic device 500 may include a director 603 capable of radiating electromagnetic wave having a wavelength that is difficult to pass through the hole. For example, the electronic device 500 including the director 603 may reduce a size of the electronic device 500, that is thickness, by providing a structure capable of transmitting electromagnetic wave to the outside through a relatively small hole.

Figure 7A:
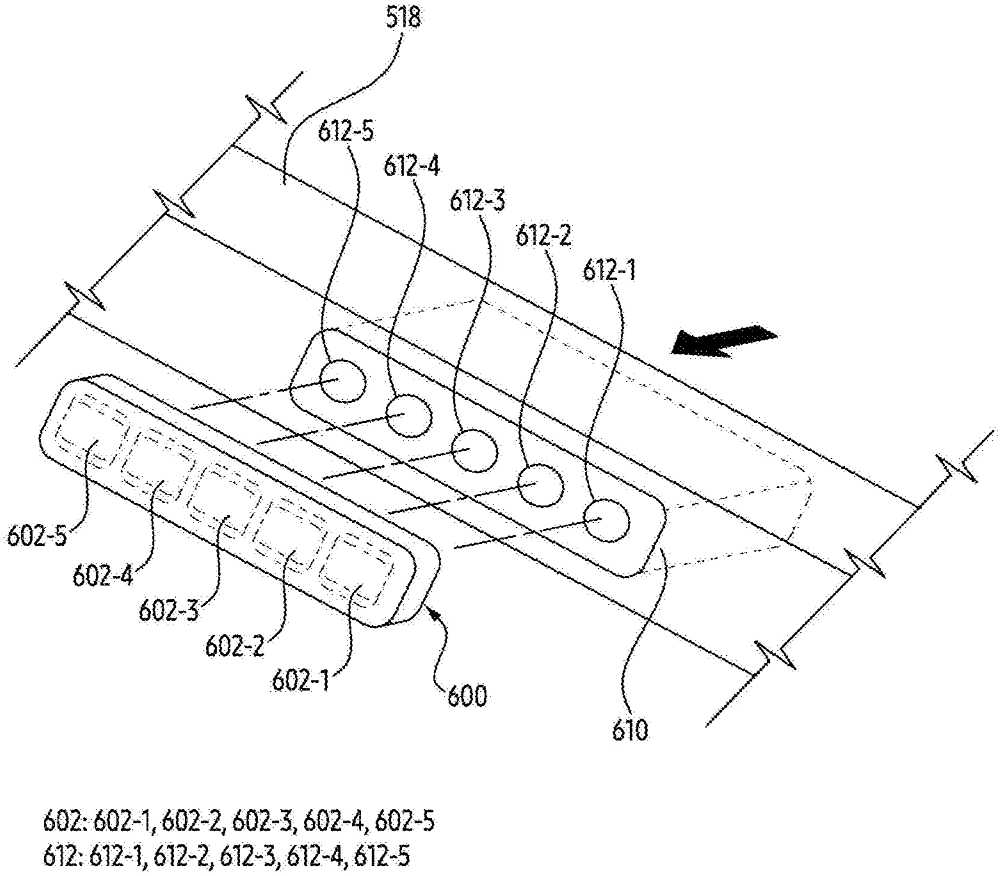
FIGS. 7A, 7B, and 7C are diagrams illustrating an arrangement relationship between a hole formed in a housing and an antenna module according to various embodiments.
Figure 7B:
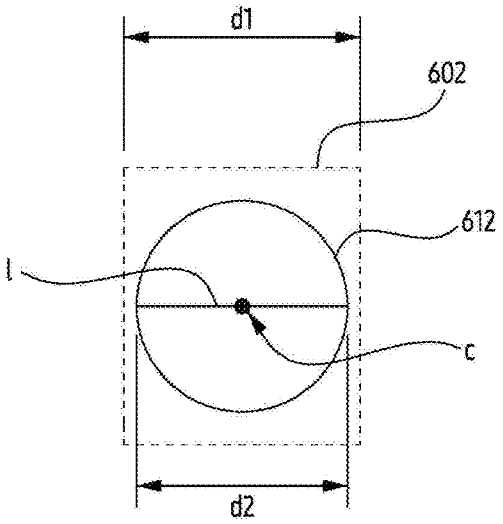
Figure 7C:
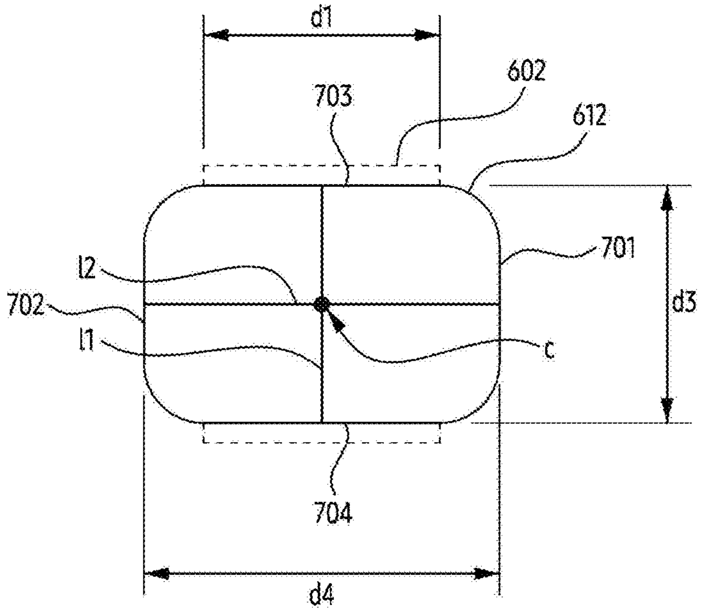

FIGS. 7A, 7B, and 7C are diagrams illustrating an example arrangement relationship between a hole formed in a housing and an antenna module according to various embodiments.

Referring to FIGS. 7A and 7B, an antenna module 600 may include a first conductive member 602. A side bezel structure 518 may include a hole 612 formed in a groove 610.

According to an embodiment, the first conductive member 602 may include a plurality of conductive members 602-1, 602-2, 602-3, 602-4, and 602-5 forming antenna elements. The groove 610 may be formed in an area of the side bezel structure 518 corresponding to the antenna module 600. The groove 610 may include the hole 612 formed therein and penetrating a surface and another surface of the side bezel structure 518. The hole 612 may include a plurality of holes 612-1, 612-2, 612-3, 612-4, and 612-5 through which electromagnetic wave radiated from antenna elements pass. The plurality of holes 612-1, 612-2, 612-3, 612-4, and 612-5 may be configured to correspond to the plurality of conductive members 602-1, 602-2, 602-3, 602-4, and 602-5.

Referring to FIG. 7B, the first conductive member 602 may be aligned with a center c of the hole 612. For example, when the hole 612 is directly viewed from the outside, a portion of the first conductive member 602 may overlap with the hole 612. A first length d1, which is a width of the first conductive member 602, may be a half wavelength of electromagnetic wave radiated from the first conductive member 602. According to an embodiment, a cross section of the hole 612 may be formed in a circular shape. The hole 612 may have a second length d2, which is a length of a line segment l passing through the center c. For example, a diameter of the hole 612 may be the second length d2. In an embodiment, the second length d2, which is the diameter of the hole 612, may be formed to be smaller than a length of the half wavelength of the electromagnetic wave radiated from the first conductive member 602. For example, when the second length d2 is shorter than a half wavelength of electromagnetic wave having a first polarization or a second polarization radiated from the antenna module 600, electromagnetic wave having a first polarization or a second polarization radiated from the first conductive member 602 may be difficult to pass through the hole 612. A director (e.g., the director 603 of FIG. 6A) disposed in the non-conductive material (e.g., the non-conductive material 611 of FIG. 6A) filling the hole 612 may be disposed parallel to a polarization direction of a wavelength of the first polarization or the second polarization. The director may guide electromagnetic wave including a signal having a first polarization or a signal having a second polarization into the hole 612.

Referring to FIG. 7C, the first conductive member 602 may be aligned with the hole 612. When the hole 612 is viewed from the outside, a portion of the first conductive member 602 may overlap with the hole 612. The length d1, which is the width of the first conductive member 602 used as the antenna element, may be a half wavelength of electromagnetic wave radiated from the first conductive member 602.

According to an embodiment, line segments l1 and l2 passing through a center of the hole 612 may have different lengths. A third length d3, which is a length of the first line segment l1 parallel to a polarization direction of a signal having the first polarization among the line segments l1 and l2 passing through the center of the hole 612, may be shorter than the first length d1, which is the width of the first conductive member 602. A fourth length d4, which is a length of the second line segment l2 parallel to a polarization direction of a signal having the second polarization among the line segments l1 and l2 passing through the center of the hole 612, may be longer than the first length d1, which is the width of the first conductive member 602.

According to an embodiment, the hole 612 may include a first edge 701 extending in the first direction parallel to an edge of the first conductive member 602, a second edge 702 parallel to the first edge 701, a third edge 703 extending from an end of the first edge 701 to an end of the second edge 702, and the fourth edge 704 extending from another end of the first edge 701 to another end of the second edge 702. The third length d3 of the first edge 701 and the second edge 702 may be shorter than the first length d1, which is the width of the first conductive member 602. The fourth length d4 of the third edge 703 and the fourth edge 704 may be longer than the first length d1, which is the width of the first conductive member 602. Among the line segments l1 and l2 penetrating the center of the hole 612, electromagnetic wave having a first polarization direction parallel to the first line segment l1 shorter than a half wavelength of electromagnetic wave radiated from the first conductive member 602 may be difficult to pass through the hole 612.

According to an embodiment, as the director 603 is disposed in the non-conductive member 611 filling the hole 612, the electromagnetic wave having the first polarization direction may also pass through the hole 612. According to an embodiment, since, by the director 603, the electromagnetic wave radiated from the non-conductive member 611 is passed, the hole 612 may have a width smaller than a half wavelength of the electromagnetic wave. As a size of the hole 612 decreases, thickness of an electronic device (e.g., the electronic device 100 of FIG. 1, the electronic device 500 of FIG. 5, or the electronic device 500 of FIG. 6) may decrease. A size of the hole 612 passing through the side bezel structure 518 decrease, and thus rigidity of the side bezel structure 518 may increase. FIG. 7C describes a rectangular hole 612, but an elliptical hole 612 is also possible. For example, the hole 612 may be an elliptical shape having a first line segment l1 as a short axis and a second line segment l2 as a long axis.

According to an embodiment, the third length d3, which is a length of the first line segment l1 among the line segments passing through the center of the hole 612, may be shorter than a width of the first conductive member 602. The fourth length d4, which is a length of the second line segment l2 among the line segments passing through the center of the hole 612, may be longer than the first length d1, which is the width of the first conductive member 602. For example, due to the thin thickness of the electronic device or the low height of the side bezel structure 518, the third length d3 may be smaller than the half wavelength of the electromagnetic wave having the first polarization radiated from the antenna module 600. When the third length d3 is shorter than the half wavelength of the electromagnetic wave having the first polarization radiated from the antenna module 600, the electromagnetic wave having the first polarization radiated from the first conductive member 602 may be difficult to pass through the hole 612.

According to an embodiment, the fourth length d4 may be greater than a half wavelength of electromagnetic wave having a second polarization radiated from the antenna module 600. When the fourth length d4 is longer than the half wavelength of the electromagnetic wave having the second polarization radiated from the antenna module 600, electromagnetic wave having a second polarization radiated from the first conductive member 602 may pass through the hole 612.

According to an embodiment, the first length d1, which is the width of the first conductive member 602 that is an antenna element, may be a half wavelength of the electromagnetic wave. The thickness of the side bezel structure 518 may be determined according to the thickness of the electronic device. According to the trend of thinning electronic devices, a space for forming the third length d3 of the hole 612 related to the thickness of the side bezel structure 518 may be relatively insufficient than a space for forming the fourth length d4. The fourth length d4 of the hole 612 formed along a length direction of the side bezel structure 518 may be formed to be wider than the first length d1, which is the width of the first conductive member 602. The third length d3 of the hole 612 may be shorter than the first length d1, and a fourth length d4 of the hole 612 may be longer than the first length d1.

According to an embodiment, when the hole 612 is filled with a high dielectric, the wavelength of the electromagnetic wave may be shortened, and thus may pass through the hole, but a beam radiated from the antenna element may be reflected or distorted. Instead of filling the hole 612 with a high dielectric, a director (e.g., the director 603 of FIG. 6A) may be disposed on the front of the antenna module 600 as a method capable of passing through the hole 612 having an edge with a length less than a half wavelength.

Figure 8A:
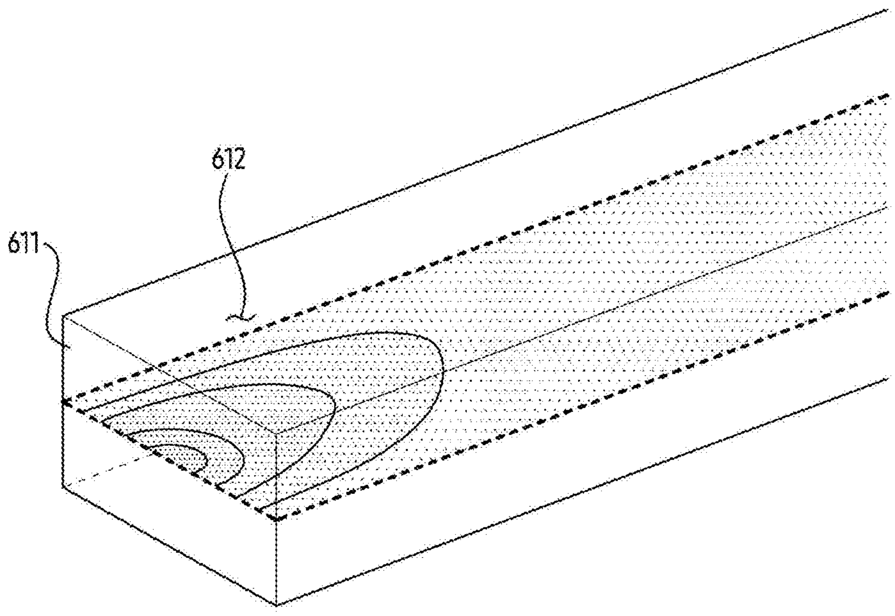
FIGS. 8A and 8B are perspective views illustrating polarization progressing from an antenna radiator through a hole according to various embodiments.
Figure 8B:
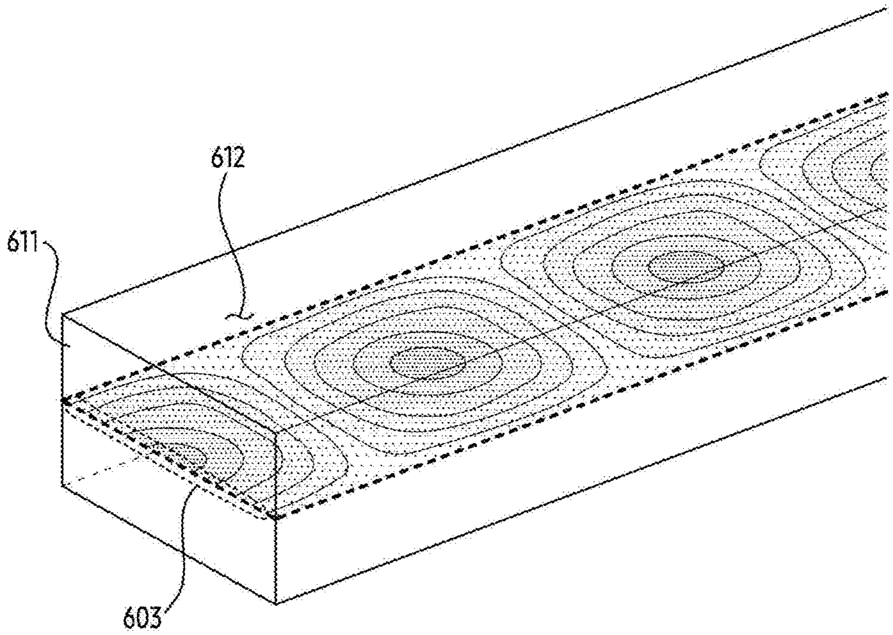

FIGS. 8A and 8B are diagrams illustrating examples of polarization progressing from an antenna radiator through a hole according to various embodiments.

Referring to FIGS. 8A and 8B, it indicates that a first polarization radiated from a first conductive member (e.g., the first conductive member 602 of FIG. 6A) does not pass through a hole 612. The hole 612 may be filled with a non-conductive member 611. According to an embodiment, the non-conductive member 611 may be filled with a dielectric. For example, the non-conductive member 611 may be replaced with air.

Referring to FIG. 8A, as illustrated in FIG. 7B, when a first length d2, which is a height of the hole 612, is less than a length of an edge of the first conductive member 602, which is a half wavelength or antenna element, electromagnetic wave having a first polarization radiated from the first conductive member 602 may not pass through. For example, when a length of a line segment perpendicular to a first polarization of the hole 612 and passing through a center of the hole 612 is less than a half wavelength of the electromagnetic wave, electromagnetic wave having the first polarization may progress to the inside of the hole 612 by a predetermined depth and then be reflected.

Referring to FIG. 8B, the hole 612 may include a director 603. The director 603 may be a conductive member formed with a length shorter than a half wavelength. The director 603 may guide electromagnetic wave with a first polarization radiated from an antenna element (e.g., the first conductive member 602 of FIG. 6A) to progress the electromagnetic wave with the first polarization into the hole 612.

According to an embodiment, the director 603 may include a plurality of conductive members. The plurality of conductive members may be disposed inside the hole 612 at regular intervals. The director 603 may guide electromagnetic wave having a first polarization using one of the plurality of conductive members to progress to the inside of the hole 612 by a certain depth. The director 603 may use another conductive member disposed inside the hole 612 to re-guide the electromagnetic wave having the first polarization transmitted to the other conductive member. An arrangement of a plurality of conductive members will be described in greater detail below with reference to FIG. 9A.

Figure 9A:
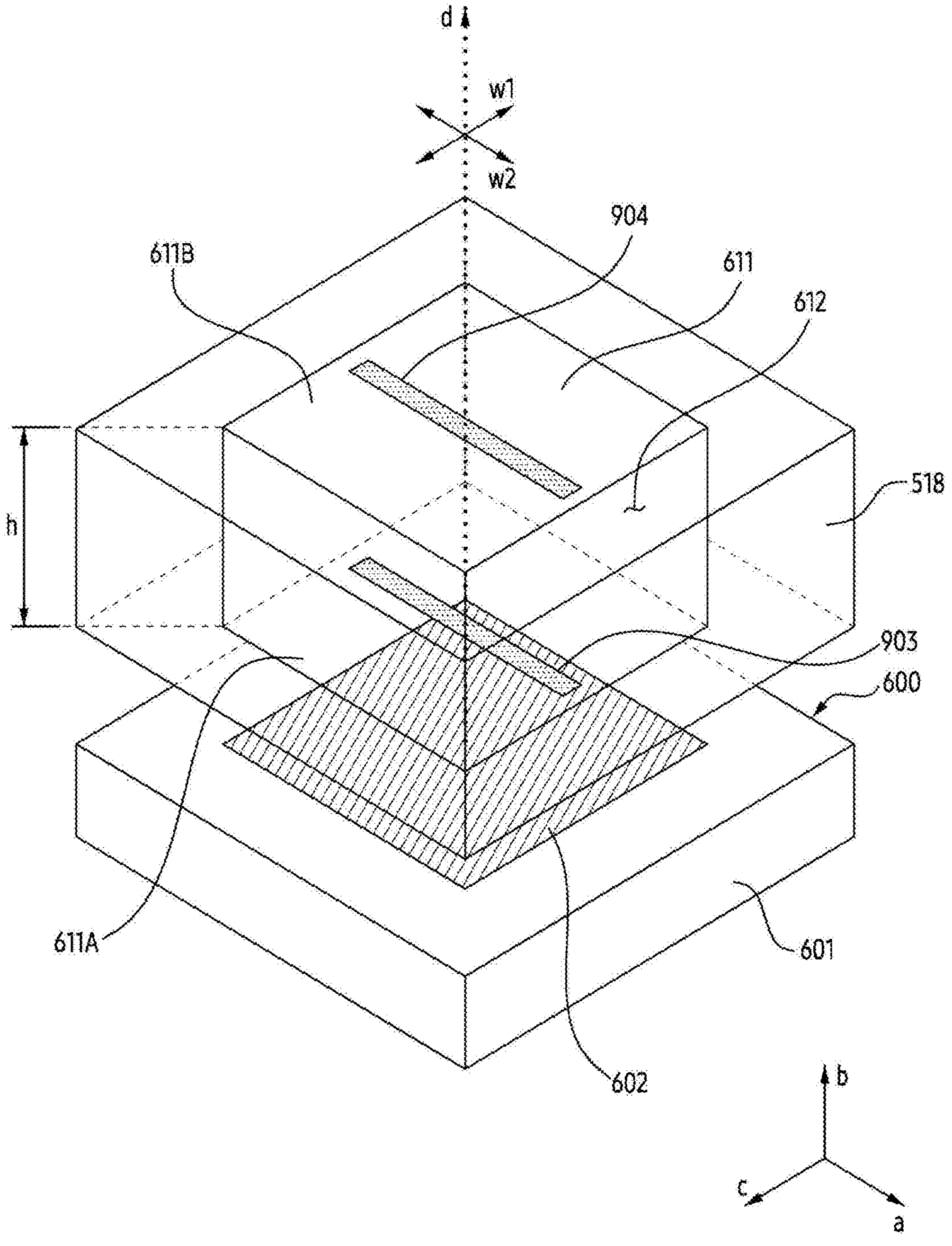
FIGS. 9A and 9B are diagrams illustrating an example arrangement of an antenna module, a hole, and a conductive member disposed in the hole according to various embodiments.
Figure 9B:
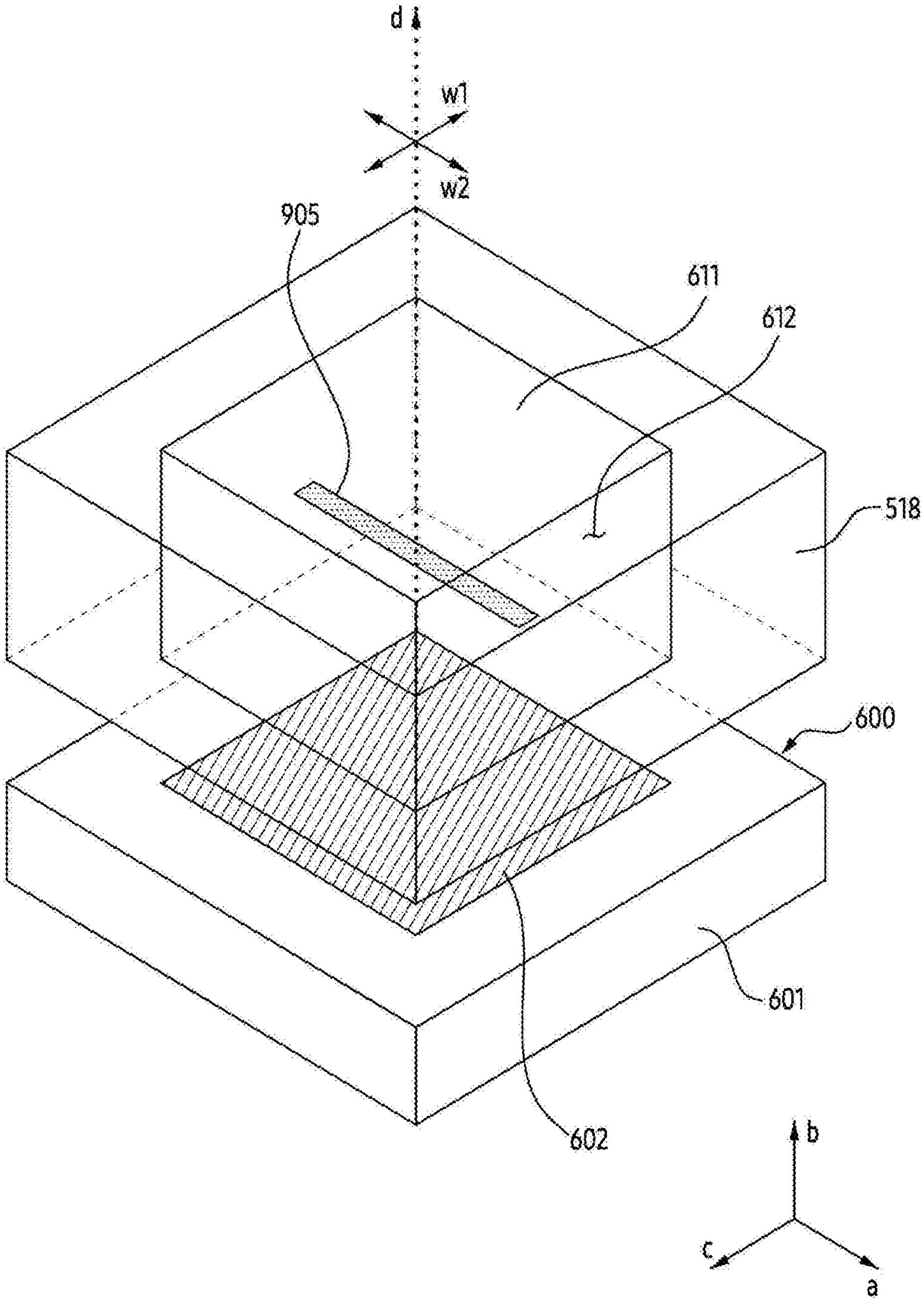

FIGS. 9A and 9B are diagrams illustrating an example arrangement of an antenna module, a hole, and a conductive member disposed in the hole according to various embodiments.

Referring to FIGS. 9A and 9B, an antenna module 600 may be disposed to form a beam in a direction in which a hole 612 is located. A non-conductive member 611 may fill the hole 612, and the non-conductive member 611 may include a first surface 611A facing a first conductive member 602 and a second surface 611B opposite to the first surface 611A. At least one conductive member 903, 904, and 905 may be disposed in the non-conductive member 611. The at least one conductive member 903, 904, and 905 may operate as a director (e.g., the director 603 of FIG. 6A).

According to an embodiment, the antenna module 600 may be disposed to form a beam toward an inner surface of a side bezel structure (e.g., the side bezel structure 518 of FIG. 5) of an electronic device (e.g., the electronic device 101 of FIG. 1 or the electronic device 500 of FIG. 5). For example, the antenna module 600 may include a first conductive member 602 disposed on a surface facing the side bezel structure. The first conductive member 602 may operate as an antenna element that radiates a beam passing through the hole 612.

Referring to FIG. 9A, the non-conductive member 611 and/or the directors 903 and 904 may be disposed in the hole 612 formed in the side bezel structure 518 according to an embodiment. The directors 903 and 904 may be formed from conductive members. In an embodiment, each of the first director 903 and the second director 904 may be disposed in one of the surfaces 611A and 611B of the non-conductive member 611 filling the hole 612. For example, the first director 903 may be disposed on the first surface 611A of the non-conductive member 611. The second director 904 may be disposed on the second surface 611B of the non-conductive member 611. The first director 903 and the second director 904 may have directionality for passing electromagnetic wave having a polarization incapable of passing through the hole 612, among electromagnetic waves having a first polarization w1 or a second polarization w2 transmitted from the first conductive member 602 in a progress direction d. For example, in order to overcome that the second polarization w2 transmitted from the first conductive member 602 in a second direction 'b', which is the progress direction d, is reflected without passing through the hole 612, the first director 903 and the second director 904 may be disposed in a first direction 'a' parallel to amplitude of the second polarization w2.

According to an embodiment, the first director 903 and the second director 904 may be disposed in order to overlap each other and overlap the hole 612 when viewed from the outside of the hole 612.

According to an embodiment, the number of directors 903 and 904 may be related to a height of the non-conductive member 611. The height h of the non-conductive member 611 may refer, for example, to a length through which electromagnetic wave penetrate in the progress direction d of the electromagnetic wave. In an embodiment, when the height h of the non-conductive member 611 is less than ¼ of the wavelength of the electromagnetic wave, the directors 903 and 904 may be configured as one director. For example, when the height h of the non-conductive member 611 is less than or equal to ¼ wavelength, only one of the first director 903 and the second director 904 may exist. For another example, when the height h of the non-conductive member 611 is greater than or equal to ¼ wavelength of the electromagnetic wave, two or more directors may be included. For example, when the height of the non-conductive member 611 is greater than or equal to ¼ wavelength, the first director 903 disposed on the first surface 611A and the second director 904 disposed on the second surface 611B may be included. When the height of the non-conductive member 611 is increased, two or more directors may be included to guide the electromagnetic wave into the hole 612. For example, a director other than directors 903 and 904 may be disposed inside the hole 612 or inside the non-conductive member 611 filling the hole 612. Although it is described that the directors 903 and 904 are positioned on a surface of the non-conductive member 611 filling the hole 612, the directors 903 and 904 may be disposed to be spaced apart from each other by a distance capable of coupling. For example, the second director 904 may be spaced apart from the first director 903 by a distance (e.g., approximately, ¼ wavelength of electromagnetic wave) capable of coupling to disposed inside the non-conductive member 611. Even when only one director exists, if the director 903 or 904 is a distance capable of coupling with the first conductive member 602, the director 903 or 904 may be disposed inside the non-conductive member 611 or between the hole 612 and the first conductive member 602.

Referring to FIG. 9B, the hole 612 formed in the side bezel structure may include the non-conductive member 611 and a third director 905 formed of a conductive member. The third director 905 may include a conductive member. In an embodiment, the third director 905 may be disposed inside the hole 612. The third director 905 may have directionality for passing electromagnetic wave having a polarization incapable of passing through the hole 612 among the first polarization w1 or the second polarization w2 transmitted from the first conductive member 602. For example, in order to overcome that only electromagnetic wave having the first polarization w1 transmitted from the first conductive member 602 passes through the hole 612 while electromagnetic wave having the second polarization is reflected without passing through the hole 612, the third director 905 may be disposed in the first direction 'a' parallel to amplitude of the electromagnetic wave having the second polarization w2.

According to an embodiment, it is described that the first director 903 and the second director 904 are disposed to overlap each other with at least a portion of the hole 612 interposed therebetween, or the third director 905 is disposed inside the hole 612, but the number and arrangement position of directors is not limited thereto. According to an embodiment, the number of directors may be determined based on a length of the hole 612. For example, when a length of the hole 612 is short, only one director may exist. In order to prevent or reduce electromagnetic wave having the first polarization radiated from the first conductive member 602 from being reflected without passing through the hole, a director may be disposed at a position capable of guiding the electromagnetic wave. The electromagnetic wave having the guided first polarization may progress into the hole 612. When a width of the electromagnetic wave having the first polarization in progress is wider than the inside of the hole 612 before the electromagnetic wave having the first polarization is transmitted to the outside of the hole 612, a director may be additionally required inside the hole 612. According to an embodiment, a position of the first director 903 or the third director 905 may be coupled to the first conductive member 602 and disposed at a position capable of guiding the electromagnetic wave having the first polarization.

Figure 10:
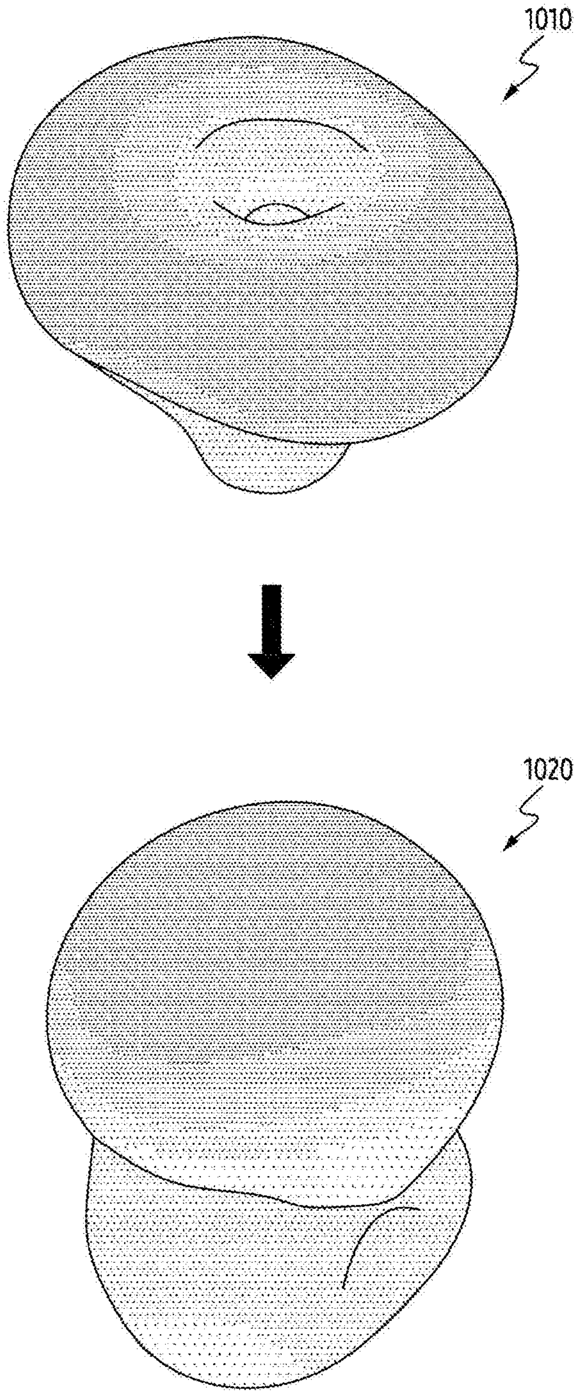
FIG. 10 is a diagram illustrating a radiation pattern in a first frequency band passing through a hole of FIG. 9A or FIG. 9B according to various embodiment.
Figure 11:
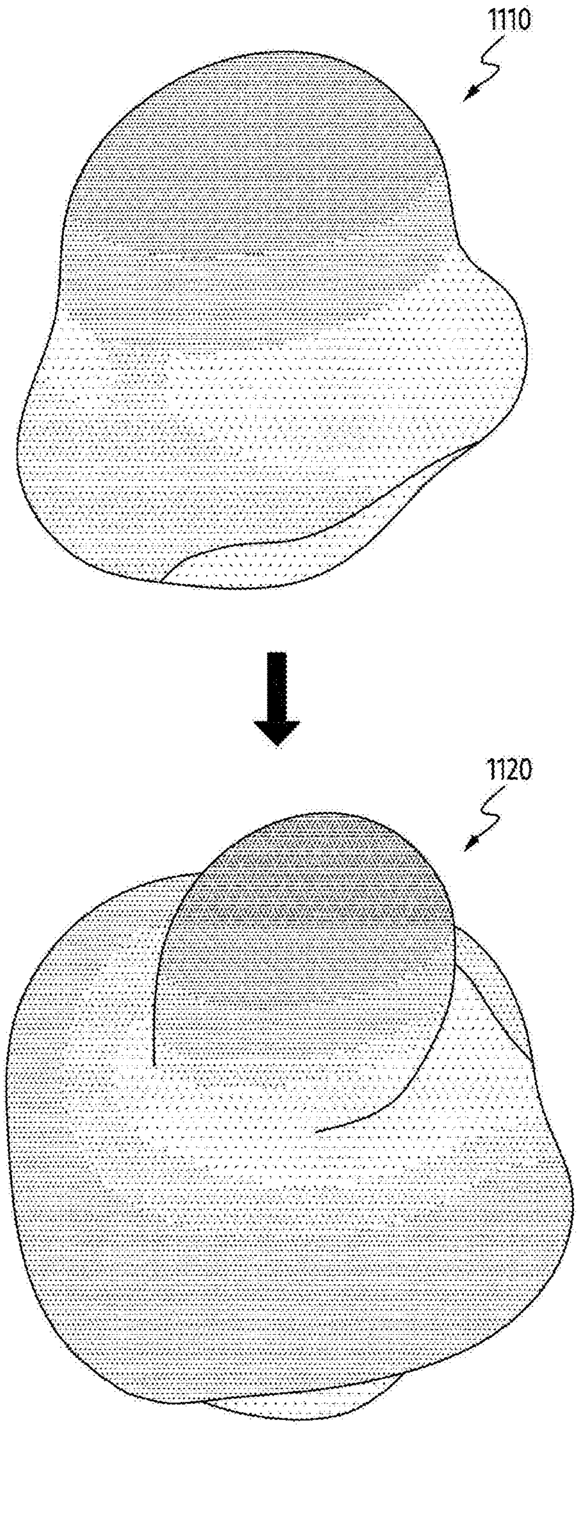
FIG. 11 is a diagram illustrating a radiation pattern in a second frequency band passing through the hole of FIG. 9A or FIG. 9B according various embodiments.

FIG. 10 is a diagram illustrating an example radiation pattern in a first frequency band passing through a hole of FIG. 9A or FIG. 9B according to various embodiments, and FIG. 11 is a diagram illustrating an example radiation pattern in a second frequency band passing through the hole of FIG. 9A or FIG. 9B according to various embodiments.

FIG. 10 illustrates a radiation pattern of a signal when a frequency band of the signal transmitted from a first conductive member (e.g., the first conductive member 602 of FIG. 6A) to the outside is a first frequency band (e.g., 28 GHz). FIG. 11 illustrates a radio pattern of a signal when a frequency band of the signal transmitted from the first conductive member 602 to the outside is a second frequency band (e.g., 38 GHz).

Referring to FIGS. 10 and 11, when a director (e.g., the director 603 of FIG. 6A, the first director 903 and the second director 904 of FIG. 9A, or the third director 905 of FIG. 9B) is not included in a hole (e.g., the hole 612 of FIG. 6A), a radiation pattern by a signal of the first frequency band may have a first radiation pattern 1010. When the director 603 is included in the hole 612, a radiation pattern of the signal of the first frequency band may have a second pattern 1020. When the director 603 is not included, a radiation pattern of the signal of the second frequency band may have a third radiation pattern 1110. When the director 603 is included in the non-conductive member 611 disposed within the hole 612, a radiation pattern of the signal of the second frequency band may have a fourth pattern 1120.

According to an embodiment, the second frequency band may have a relatively narrower wavelength than the first frequency band. When a length of a conductive member forming the director 603 is shorter than a length of a half wavelength of electromagnetic wave having a first polarization, it may operate as a director, and when the length of the conductive member is longer than the length of the half wavelength of the electromagnetic wave having the first polarization, it may operate as a reflector. The length of the conductive member forming the director 603 may be longer than the half wavelength of the electromagnetic wave having the first polarization including the signal of the second frequency band. According to an embodiment, a director disposed inside the hole 612 may operate as a director in the first frequency band, but may operate as a reflector in the second frequency band. When looking at the first pattern 1010, which is a radiation pattern of the signal of the first frequency band, it may be seen that the signal having the first polarization transmitted to the hole 612 without the director 603 is difficult to being transmitted to the outside due to the narrow width of the hole. When looking at the third pattern 1110, which is a radiation pattern of the signal of the second frequency band, it may be seen that electromagnetic wave having the first polarization transmitted to the hole 612 without the director 603 is difficult to being transmitted to the outside because a length of a line segment passing through a center of the hole 612 and parallel to the first polarization is short.

When looking at the second radiation pattern 1020 including the director 603 in the hole 612 to guide electromagnetic wave into the hole 612, it may be seen that a signal of the first frequency band transmitted to the hole 612 including the director 603 and having the first polarization is guided by the director to improve radiation performance of the signal having the first polarization transmitted to the outside. When looking at a fourth radiation pattern including the director 603 within the hole 612, it may be seen that a signal having in the second frequency band transmitted to the hole 612 including a conductive member that is the director 630 and having the first polarization is reflected to an antenna module by a conductive member operating as a reflector.

As described above, the director 603 disposed in the hole may guide electromagnetic wave having the first polarization in the first frequency band included in a low-frequency area radiated from a multi-band antenna module to pass through the hole. Since the director 603 disposed in the hole 612 may operate as a reflector in the second frequency band higher than the first frequency band, a signal of the second frequency band radiated from the multi-band antenna module may be reflected. A structure of a director capable of passing signals in a plurality of frequency bands radiated from the multi-band antenna module is required. The structure of the director usable in the multi-band antenna module will be described in greater detail below with reference to FIG. 12.

Figure 12:
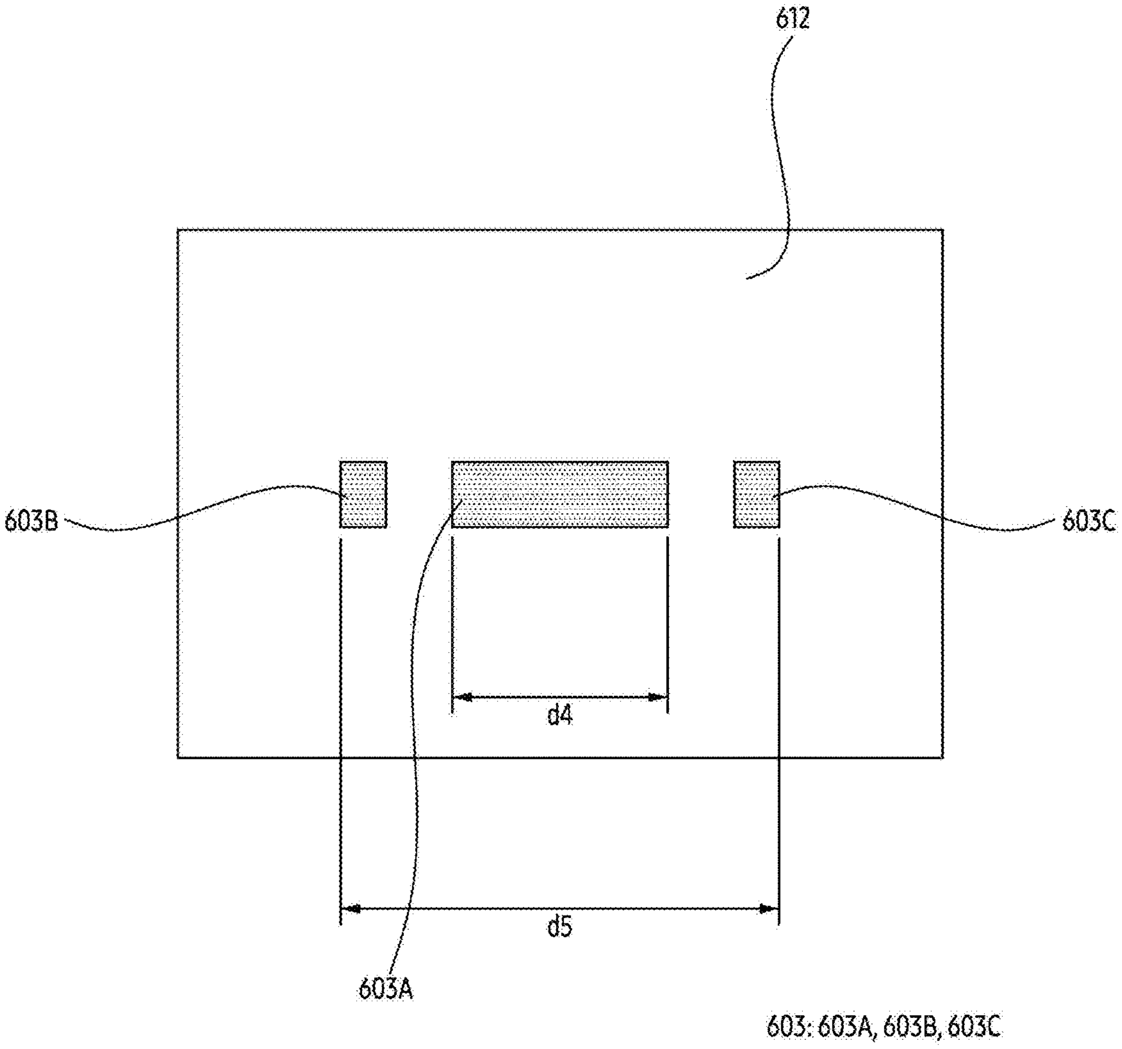
FIG. 12 is a diagram illustrating a deformed example of a director according to various embodiments.

FIG. 12 is a diagram illustrating a deformed example of a director according to various embodiments.

Referring to FIG. 12, a director 603 may include a plurality of segmented conductive members. For example, the director 603 may include a second conductive member 603A, a third conductive member 603B, and/or a fourth conductive member 603C capable of operating as a single director. According to an embodiment, a processor (e.g., the processor 120 of FIG. 1) may be electrically connected to a first conductive member 602. The processor 120 may be configured to communicate with an external electronic device using a first frequency band (e.g., 28 GHz) or a second frequency band (e.g., 38 GHz) through an antenna module 600 and the director 603. The processor 120 may communicate a signal of the second frequency band having a relatively high frequency band with an external electronic device, through a portion of the conductive members 603A, 603B, and 603-3 of the director 603. For example, the processor 120 may communicate a signal of the second frequency band with an external electronic device distinct from the electronic device, through the first conductive member 602 and the second conductive member 603A. The processor 120 may communicate a signal of the first frequency band having a relatively lower frequency band than the second frequency band with an external electronic device, using all of the conductive members 603A, 603B, and 603-3 of the director 603. For example, the processor 120 may be configured to communicate a signal of the first frequency band lower than the second frequency band with an external electronic device distinct from the electronic device, through the first conductive member 602, the second conductive member 603A, the third conductive member 603B coupled to the second conductive member 603A, and the fourth conductive member 603C coupled to the second conductive member 603A.

The director 603 may guide electromagnetic wave having a first polarization among electromagnetic waves of the second frequency band transmitted from the first conductive member 602 into the hole 612. For example, among electromagnetic waves progressing toward the hole 612, due to a size of the hole 612, when a signal having the first polarization does not pass through the hole, and a signal having a second polarization passes through the hole, the second conductive member 603A of the director 603 may be disposed parallel to a polarization direction of the first polarization in order to pass through the signal having the first polarization. The second conductive member 603A facing the first conductive member 602 may be disposed in the hole 612 and be coupled to the first conductive member 602. The second conductive member 603A may be coupled to the first conductive member 602 to operate as the director 603.

According to an embodiment, the third conductive member 603B may be disposed in the hole 612, and spaced apart from an end of the second conductive member 603A in a first direction, which is a polarization direction of the first polarization. The fourth conductive member 603C may be disposed in the hole 612, and spaced apart from another end of the second conductive member 603A in a second direction opposite to the first direction. The third conductive member 603B and the fourth conductive member 603C may be coupled to the second conductive member 603A. The second conductive member 603A may be coupled to the third conductive member 603B and the fourth conductive member 603C to operate as the director 603.

According to an embodiment, based on a frequency band of a signal included in a beam radiated from a first conductive member (e.g., the first conductive member 602 of FIG. 6A), which is an antenna element, the second conductive member 603A may operate as a director, or the second conductive member 603A, the third conductive member 603B, and the fourth conductive member 603C may operate as a director.

According to an embodiment, as illustrated in FIG. 12, the director 603 in a shape segmented into the second conductive member 603A, the third conductive member 603B, and the fourth conductive member 603C may be applied to an antenna module supporting a multi-band or dual band that transmit and receive signals of the first frequency band (e.g., 28 GHz) and the second frequency band (e.g., 38 GHz). A fourth length d4 of the second conductive member 603A may be smaller than a length of a half wavelength of the second frequency band, which is a relatively high frequency band. The second conductive member 603A may operate as the director 603 with respect to a signal having a polarization of the second frequency band. The sum of lengths of the second conductive member 603A, the third conductive member 603B, and the fourth conductive member 603C, or a total length d5 in which the second conductive member 603A, the third conductive member 603B, and the fourth conductive member 603C are segmented and disposed may be smaller than a length of a half wavelength of the first frequency band. The second conductive member 603A, the third conductive member 603B, and the fourth conductive member 603C may be coupled to each other to operate as a single director. As the overall length of the second conductive member 603A, the third conductive member 603B, and the fourth conductive member 603C operating as a single director increases, the second conductive member 603A, the third conductive member 603B, and the fourth conductive member 603C may operate as a director with respect to a signal having a polarization of the first frequency band, which is a relatively low frequency band.

According to an embodiment, the second conductive member 603A may operate as a director with respect to a signal of the second frequency band. When operating as a director with respect to a signal of the second frequency band, only the second conductive member 603A may operate as a director, and the second conductive member 603A may not be coupled to the third conductive member 603B and the fourth conductive member 603C.

Figure 13:
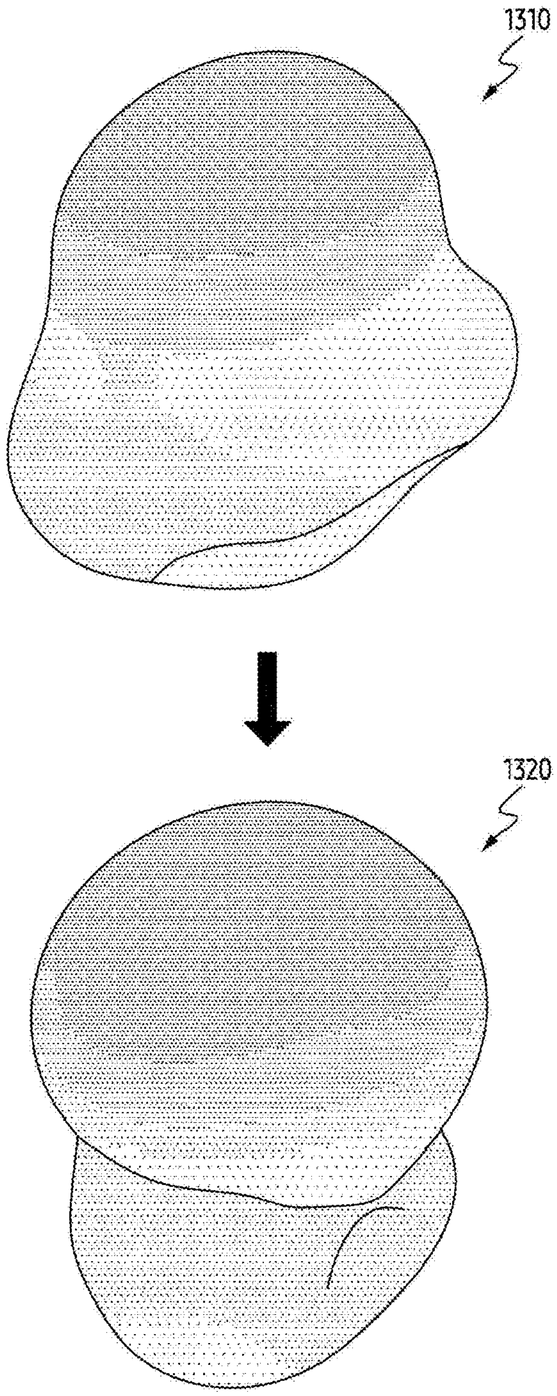
FIG. 13 is a diagram illustrating a radiation pattern in a second frequency band of a beam passing through a hole of FIG. 12 according to various embodiments.

According to the described above embodiment, the director 603 may use the entire segmented conductive members 603A, 603B, and 603C with respect to a signal of a relatively low frequency band (e.g., the first frequency band (about 28 GHz)). On the other hand, the director 603 may use a portion (e.g., second conductive member 603A) of the segmented conductive members 603A, 603B, and 603C with respect to a signal of a relatively high frequency band (e.g., about 38 GHz). For example, among the segmented conductive members, a conductive member aligned with the antenna module may operate as a director. For example, an unsegmented director may reflect a signal of a portion of a plurality of frequency bands transmitted from the antenna module supporting the multi-band, but the director 603 including the segmented conductive members 603A, 603B, and 603C may guide the transmitted signal and transmit it to the inside of the hole 612 using a portion (e.g., the second conductive member 603A) of the conductive members 603A, 603B, and 603C. The director including the segmented conductive member may guide signals in various frequency bands transmitted from the antenna module supporting the multi-band to be transmitted into the hole 612. FIG. 13 illustrates a radiation pattern in a second frequency band of a beam passing through a hole of FIG. 12.

FIG. 13 is a diagram illustrating an example radiation pattern of a signal when a frequency band of a signal transmitted from the first conductive member 602 to the outside is a second frequency band (e.g., 38 GHz) according to various embodiments. A director disposed in the hole 612 may be disposed similarly to the director described in FIGS. 9A and 9B. The number of directors may be determined according to a length of the hole, and the director may be disposed at a position requiring a guide. A shape of a director according to an embodiment may be a segmented shape, which is substantially the same as the director 603 illustrated in FIG. 12.

According to an embodiment, the second frequency band may have a relatively narrower wavelength than a first frequency band. When a length of the conductive member is shorter than a length of a half wavelength of electromagnetic wave forming a beam, it may operate as a director, and when the length of the conductive member is longer than the length of the half wavelength of the electromagnetic wave, it may operate as a reflector. The length of the conductive member may be shorter than a half wavelength of electromagnetic wave including a signal of a second frequency band. According to an embodiment, the second conductive member 603A, the third conductive member 603B, and the fourth conductive member 603C of a director disposed within the hole 612 may be coupled at the first frequency band, and the coupled second conductive member 603A, the third conductive member 603B, and the fourth conductive member 603C may operate as a director in the first frequency band. The second conductive member 603A, the third conductive member 603B, and the fourth conductive member 603C of the director disposed within the hole 612 may not be coupled at the second frequency band, and the second conductive member 603A may operate as a director in the second frequency band.

According to an embodiment, when the director 603 is not included, a radiation pattern of a signal having a first polarization of the second frequency band may have a radiation pattern 1310. When the segmented director 603 is included in the hole 612, the radiation pattern of the signal having the first polarization of the second frequency band may have a radiation pattern 1320.

When looking at the radiation pattern 1310, it may be seen that a signal having a first polarization of the second frequency band transmitted to a hole without a director is difficult to be transmitted to the outside, due to the narrow width of the hole. When looking at a radiate pattern including a conductive member (e.g., the director 603) in the hole 612 at the lower drawing, it may be seen that a signal having the first polarization of the second frequency band transmitted to the hole including a conductive member has a beam pattern enhanced by the director 603 formed of the segmented conductive members 603A, 603B, and 603C.

As described above, a director disposed in the hole may guide a signal of the second frequency band in a high frequency domain radiated from the antenna module supporting the multi-band to pass through the hole, while guiding a signal of the first frequency band in a low frequency domain radiated from the antenna module supporting the multi-band to pass through the hole.

Figure 14A:
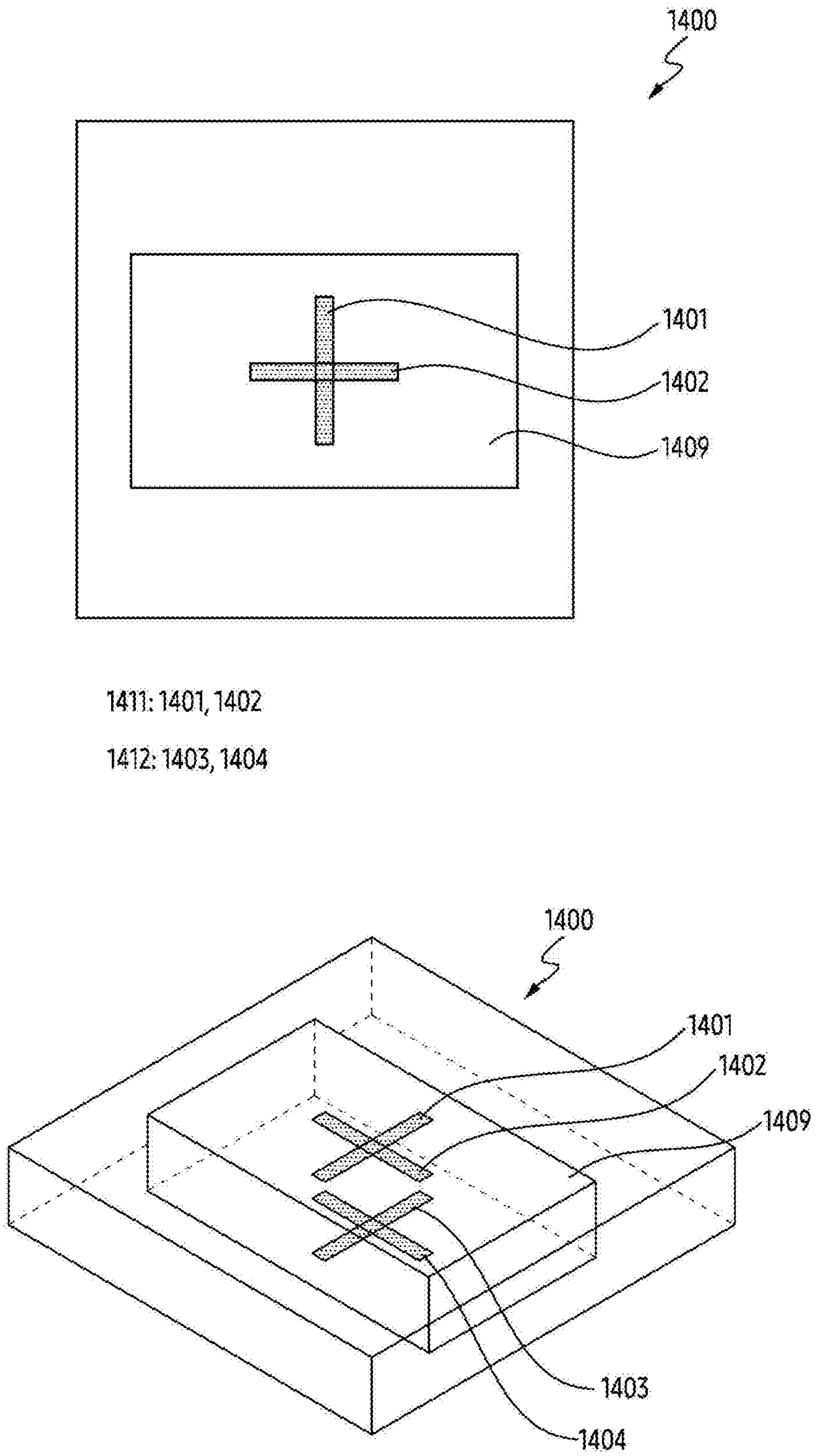
FIGS. 14A, 14B, and 14C are diagrams illustrating deformed examples of various types of directors according to various embodiments.
Figure 14B:
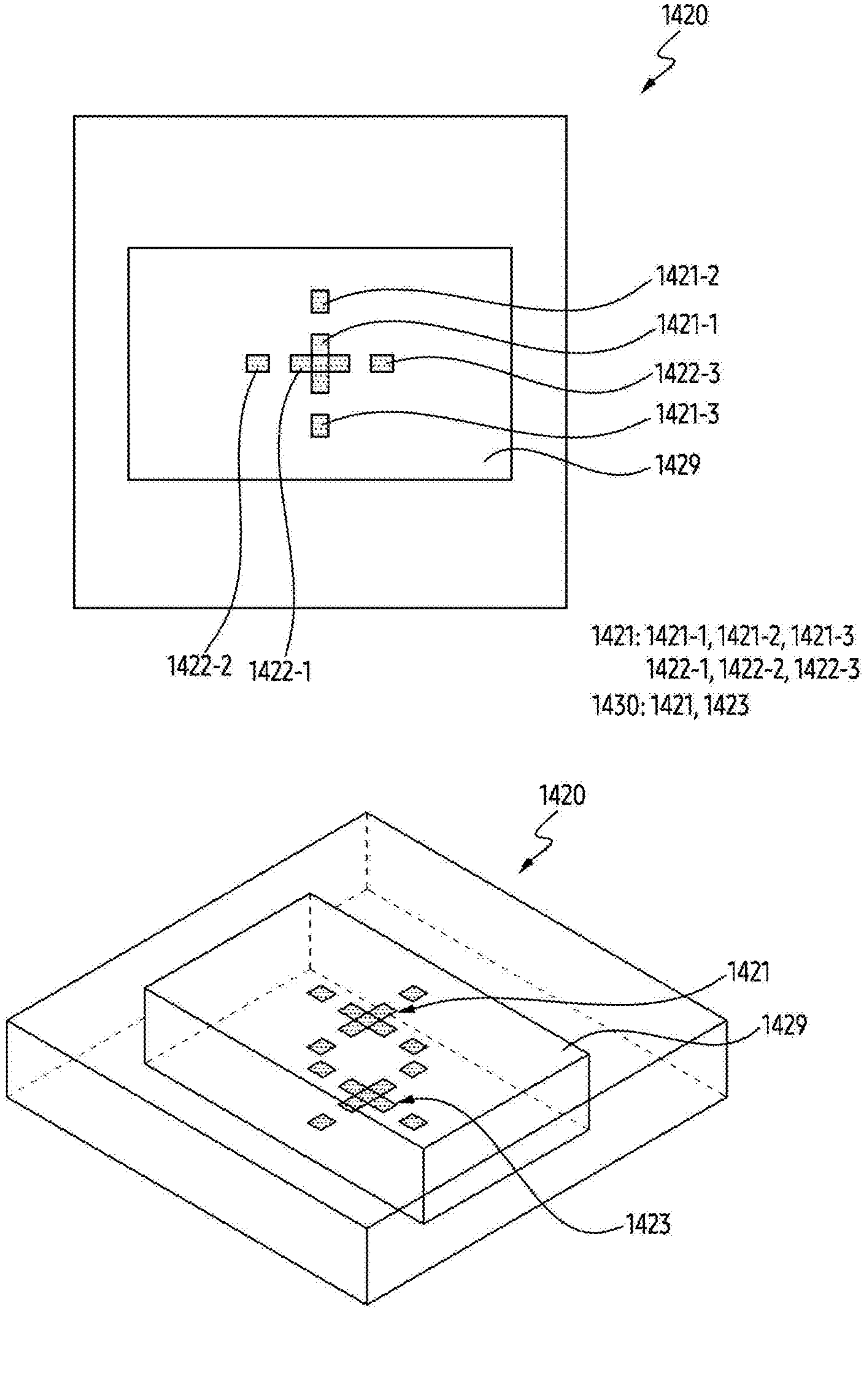
Figure 14C:
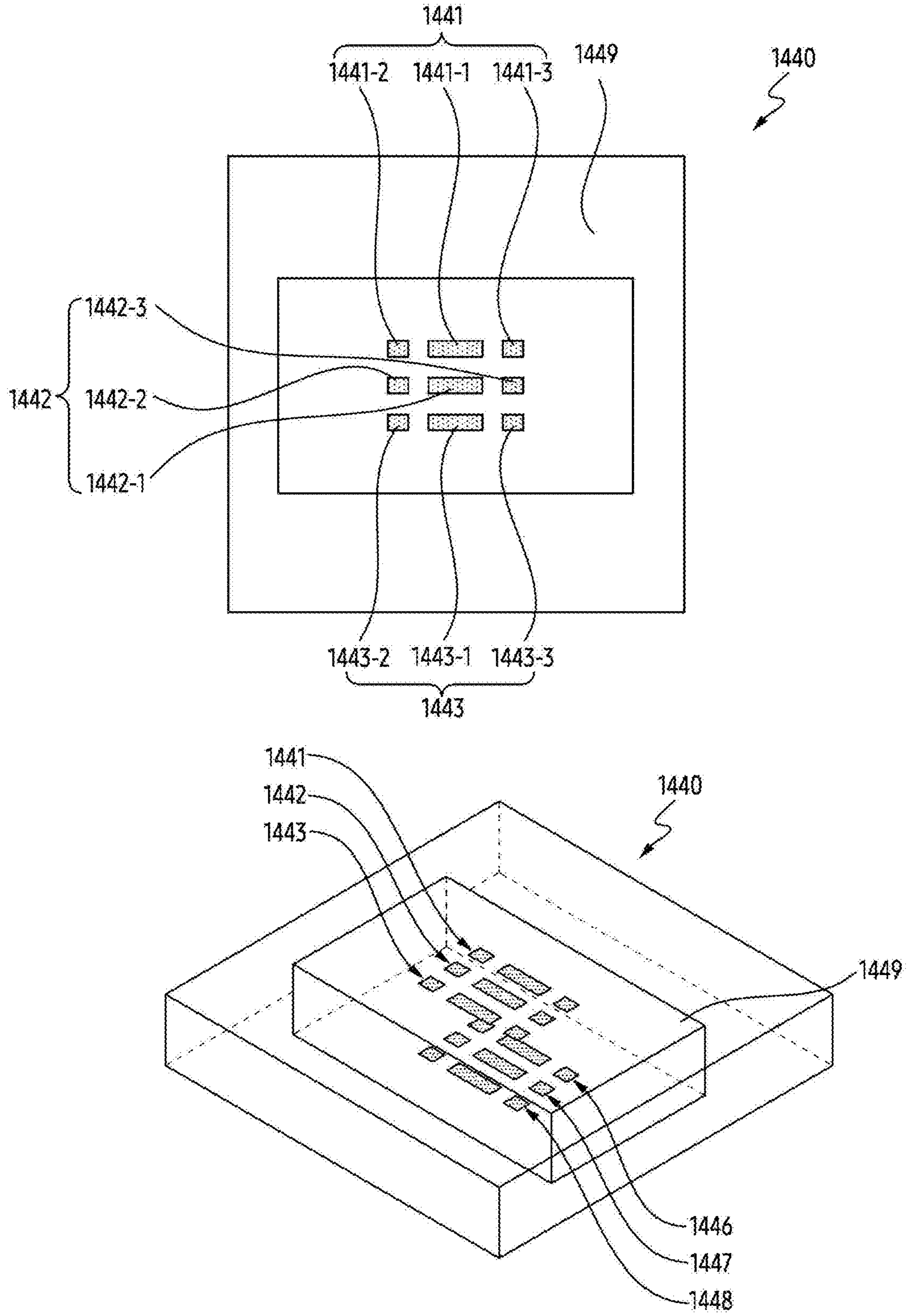

FIGS. 14A, 14B, and 14C are diagrams illustrating deformed examples of various types of directors according to various embodiments.

FIG. 6A, FIG. 6B, FIG. 7A, FIG. 7B, FIG. 9A, FIG. 9B, and FIG. 12 assume and describe that electromagnetic wave having a first polarization does not pass through a hole, but FIGS. 14A and 14B describe a director capable of being applied when not only the electromagnetic wave having first polarization but also electromagnetic wave having the second polarization perpendicular to the first polarization does not pass through the hole.

Referring to FIG. 14A, an electronic device 1400 may include a cross-shaped first director 1411 facing a first conductive member (e.g., the first conductive member 602 of FIG. 6A) that is an antenna element, disposed in a hole 1409, and coupled to the first conductive member 602. The cross-shaped first director 1411 may include a second conductive member 1401 extending in a first direction and a third conductive member 1402 extending in a direction perpendicular to the first direction. For example, the second conductive member 1401 and the third conductive member 1402 may be integrally formed with each other.

According to an embodiment, the second conductive member 1401 and the third conductive member 1402 may be aligned with respect to the first conductive member 602. For example, a center of the second conductive member 1401, which is located at substantially the same distance from both ends of the second conductive member 1401, may be disposed to overlap a designated position of the first conductive member 602. A centers of the third conductive member 1402, which is located at substantially the same distance from both ends of the third conductive member 1402, may be disposed to overlap the designated position of the first conductive member 602. For example, the designated position of the first conductive member 602 may be a position on a path along which a radiated beam pattern is progressed.

According to an embodiment, the third conductive member 1402 may be a director used to guide electromagnetic wave having a second polarization to the hole 1409, and the second conductive member 1401 may be a director used to guide electromagnetic wave having a first polarization to the hole 1409. According to a recent trend of thinning electronic devices, the third conductive member 1402 may be disposed in the hole 1409 and used as a director, in order to transmit electromagnetic wave having the second polarization through the hole 1409. When a gap between holes as well as the total thickness of the electronic device 1400 decreases due to a lack of mounting space of the electronic device 1400, a width of the hole 1409 may be smaller than a half wavelength of the electromagnetic wave having the first polarization. When the width of the hole 1409 is narrowed, the second conductive member 1401 may be further required to transmit the electromagnetic wave having the first polarization through the hole 1409. A length of the second conductive member 1401 may be formed to be shorter than the half wavelength of the electromagnetic wave having the first polarization.

According to an embodiment, the electronic device 1400 may further include a second director 1412 corresponding to the second conductive member 1401 and the third conductive member 1402. For example, the electronic device 1400 may include a fourth conductive member 1403 and a fifth conductive member 1404 corresponding to the second conductive member 1401 and the third conductive member 1402. The fourth conductive member 1403 may extend in the same direction as the second conductive member 1401 and may be disposed in parallel. The fifth conductive member 1404 may extend in the same direction as the third conductive member 1402 and may be disposed in parallel.

According to an embodiment, the electronic device 1400 is described as including the first director 1411 formed of the second conductive member 1401 and the third conductive member 1402 and the second director 1412 formed of the fourth conductive member 1403 and the fifth conductive member 1404, but it is not limited thereto, and the number and arrangement of directors may vary according to a length of the hole 1409. Referring to FIG. 14B, the electronic device 1420 may include a director 1421 including segmented conductive members 1421-1, 1421-2, 1421-3, 1422-1, 1422-2, and 1422-3. Like the director of FIG. 14A, the director 1421 may operate as a director with respect to both the first polarization and the second polarization. Like the director 603 of FIG. 12, the director 1421 may operate as a director with respect to both signals in the first frequency band and the second frequency band.

According to an embodiment, the electronic device 1420 may use the second conductive member 1421-1, the third conductive member 1421-2, and the fourth conductive member 1421-3 as a director, in order to guide electromagnetic wave having the first polarization of the first frequency band into the hole 1429. For example, the second conductive member 1421-1, the third conductive member 1421-2, and the fourth conductive member 1421-3 coupled to the electromagnetic wave having the first polarization of the first frequency band may guide the electromagnetic wave having the first polarization of the first frequency band radiated from the antenna element into the hole 1429. An arrangement of the second conductive member 1421-1, the third conductive member 1421-2 and the fourth conductive member 1421-3 may be similar to the arrangement of the second conductive member 603A, the third conductive member 603B, and the fourth conductive member 603C of FIG. 12.

According to an embodiment, the electronic device 1402 may use a fifth conductive member 1422-1, a sixth conductive member 1422-2 and a seventh conductive member 1422-3 as a director to guide electromagnetic wave having a second polarization of the first frequency band into the hole 1429. Each of the sixth conductive member 1422-2 and the seventh conductive member 1422-3 may be coupled to the fifth conductive member 1422-1 with respect to an electromagnetic wave having the second polarization of the first frequency band. The fifth conductive member 1422-1, the sixth conductive member 1422-2, and the seventh conductive member 1422-3 respectively coupled with respect to electromagnetic wave having the second polarization of the first frequency band may guide the electromagnetic wave having the second polarization of the first frequency band radiated from the antenna element to progress the electromagnetic wave into the inside of the hole 1429.

According to an embodiment, the fifth conductive member 1422-1, the sixth conductive member 1422-2 and the seventh conductive member 1422-3 may have substantially the same configuration as the second conductive member 1421-1, the third conductive member 1421-2 and the fourth conductive member 1421-3, except for an arrangement direction. For example, the fifth conductive member 1422-1, the sixth conductive member 1422-2, and the seventh conductive member 1422-3 may be disposed perpendicular to the second conductive member 1421-1, the third conductive member 1421-2, and the fourth conductive member 1421-3. A spaced distance between the fifth conductive member 1422-1, the sixth conductive member 1422-2 and the seventh conductive member 1422-3 may be substantially similar to a spaced distance between the second conductive member 1421-1, the third conductive member 1421-2 and the fourth conductive member 1421-3.

According to an embodiment, the director 1430 may include a first director 1421 and a second director 1423. The first director 1421 may be disposed on a surface of the hole 1429, and the second director 1423 may be disposed on another surface of the hole 1429. According to an embodiment, the electronic device 1420 may include only one of the first director 1421 and the second director 1423 according to a length of the hole 1429, and may further include an additional director.

Referring to FIG. 14C, the electronic device 1440 may include a plurality of segmented directors 1441, 1442, 1443, 1446, 1447, and 1448.

According to an embodiment, the first director 1441, the second director 1442, and the third director 1443 may be spaced apart from each other and disposed parallel to each other. The first director 1441, the second director 1442, and the third director 1443 may be disposed on substantially the same plane. For example, the first director 1441, the second director 1442, and the third director 1443 may be disposed on a surface of the hole 1449. The first director 1441 may include a plurality of conductive members 1441-1, 1441-2, and 1441-3. The plurality of conductive members 1441-1, 1441-2, and 1441-3 may be disposed to be spaced apart from each other. The second director 1442 may include a plurality of conductive members 1442-1, 1442-2, and 1442-3. The plurality of conductive members 1442-1, 1442-2, and 1442-3 may be disposed to be spaced apart from each other. The third director 1443 may include a plurality of conductive members 1443-1, 1443-2, and 1443-3. The plurality of conductive members 1443-1, 1443-2, and 1443-3 may be disposed to be spaced apart from each other.

According to an embodiment, a fourth director 1446, a fifth director 1447, and a sixth director 1448 may be spaced apart from each other and disposed parallel to each other. The fourth director 1446, the fifth director 1447, and the sixth director 1448 may be disposed on the same plane. For example, the fourth director 1446, the fifth director 1447, and the sixth director 1448 may be disposed on another surface of the hole 1449 facing the surface of the hole 1449. The fourth director 1446, the fifth director 1447, and the sixth director 1448 may include segmented conductive members like the first director 1441, the second director 1442, and the third director 1443.

According to an embodiment, the first director 1441, the second director 1442, the third director 1443, the fourth director 1446, the fifth director 1447, and the sixth director 1448 may operate as a director with respect to beams of various frequency bands radiated from the antenna module supporting the multi-band, by including segmented conductive members.

According to an embodiment, the first director 1441, the second director 1442, and the third director 1443 may be disposed on a surface of the hole, thereby enhancing coupling between each of directors. As the coupling is enhanced, the amount of electromagnetic wave radiated by the first director 1441, the second director 1442, and the third director 1443 may increase, and the increased electromagnetic wave may be guided into the hole 1449.

According to an embodiment, the electronic device may guide a signal of various frequency bands radiated from the antenna module supporting the multi-band to pass through the hole, using a director formed of a segmented conductive member. The electronic device may communicate with an external electronic device through a signal passing through the hole.

According to an embodiment, a director having a conductive member formed in a cross shape may operate as a director with respect to both electromagnetic waves having a first polarization and a second polarization. The electronic device may reduce not only a height of the hole but also a width of the hole, using the director having the conductive member formed in a cross shape. By reducing a size of the hole, thickness of the electronic device may be reduced. By reducing the width of the hole, the electronic device may provide a structure capable of securing a mounting space for another component.

According to an example embodiment, an electronic device (e.g., the electronic device 500 of FIG. 6A) may comprise: a housing (e.g., the housing 530 of FIG. 6A) including a front plate (e.g., the display 501 of FIG. 6A), a rear plate (e.g., the rear plate 511 of FIG. 6A) facing in an opposite direction to the front plate, and a side bezel (e.g., the side bezel structure 518 of FIG. 6A) surrounding a space between the front plate and the rear plate, a hole (e.g., the hole 612 of FIG. 6A) formed at the side bezel, a non-conductive member (e.g., the non-conductive member 611 of FIG. 6A) comprising a non-conductive material filling the hole, an antenna module (e.g., the antenna module 600 of FIG. 6A) including a substrate disposed in the housing spaced apart from the at least hole, and a first conductive member (e.g., the first conductive member 602 of FIG. 6A) comprising a conductive material disposed on a surface of the substrate facing the at least one hole and radiating a signal with a first polarization or a second polarization, a second conductive member (e.g., the second conductive member 603A of FIG. 12) comprising a conductive material facing the first conductive member and disposed at the non-conductive member, the second conductive member being parallel to a polarization direction of the first polarization and coupled to the first conductive member, a third conductive member (e.g., the third conductive member 603B of FIG. 12) comprising a conductive material disposed at the non-conductive member and spaced apart from an end of the second conductive member, a fourth conductive member (e.g., the fourth conductive member 603C of FIG. 12) comprising a conductive material disposed at the non-conductive member and spaced apart from another end of the second conductive member, and at least one processor (e.g., the processor 120 of FIG. 1, the first communication processor 212 of FIG. 2, or the second communication processor 214 of FIG. 2), comprising processing circuitry, operably coupled to the first conductive member, wherein at least one processor, individually and/or collectively, may be configured to: communicate a signal of a first frequency band with an external electronic device distinct from the electronic device through the first conductive member and the second conductive member, and communicate a signal of a second frequency band lower than the first frequency band with an external electronic device distinct from the electronic device through the first conductive member, the second conductive member, the third conductive member coupled to the second conductive member, and the fourth conductive member coupled to the second conductive member.

According to an example embodiment, a portion of the first conductive member may overlap with the at least one hole when viewing the at least one hole from the outside.

According to an example embodiment, the second conductive member, the third conductive member, and the fourth conductive member may be disposed on a surface of the non-conductive member facing the first conductive member.

According to an example embodiment, the second conductive member, the third conductive member, and the fourth conductive member may be disposed in the non-conductive member.

According to an example embodiment, the at least one hole may include a first edge extending in a first direction parallel to the first conductive member, a second edge parallel to the first edge, a third edge extending from an end of the first edge to an end of the second edge, and a fourth edge extending from another end of the first edge to another end of the second edge, wherein a length of the third edge and a length of the fourth edge may be shorter than a length of the first conductive member.

According to an example embodiment, a length of the first edge and a length of the second edge may be longer than a length of the first conductive member.

According to an example embodiment, the electronic device may comprise: a fifth conductive member (e.g., the fifth conductive member 1422-1 of FIG. 14B) comprising a conductive material extending parallel to the third edge from each of edges of the second conductive member parallel to the first edge, a sixth conductive member (e.g., the sixth conductive member 1422-2 of FIG. 14B) comprising a conductive material spaced apart from the fifth conductive member in a third direction perpendicular to the first direction, and a seventh conductive member (e.g., the seventh conductive member 1422-3 of FIG. 14B) comprising a conductive material spaced apart from the fifth conductive member in a direction opposite to the third direction, wherein a length of the first edge and a length of the second edge may be shorter than the length of the first conductive member.

According to an example embodiment, at least one processor, individually and/or collectively, may be configured to communicate a signal of the first frequency band with an external electronic device distinct from the electronic device, through the first conductive member and the fifth conductive member, and communicate with an external electronic device distinct from the electronic device, using the second frequency band lower than the first frequency band, through the first conductive member, the fifth conductive member, the sixth conductive member, and the seventh conductive member.

According to an example embodiment, a signal of the first frequency band communicated by at least one processor through the first conductive member may include: a first polarization signal having a polarization characteristic in the first direction and a second polarization signal having a polarization characteristic in the third direction, wherein the first polarization signal may be communicated through the fifth conductive member, and the second polarization signal may be communicated through the second conductive member.

According to an example embodiment, a length of the second conductive member may be less than a specified ratio of a wavelength of electromagnetic wave corresponding to the first frequency band guided within the at least one hole by the second conductive member.

According to an example embodiment, a sum of lengths of the second conductive member, the third conductive member, and the fourth conductive member may be less than a specified ratio of a wavelength of electromagnetic wave corresponding to the second frequency band guided within the at least one hole by the second conductive member.

According to an example embodiment, the first conductive member may include a plurality of conductive elements (e.g., the plurality of conductive members 602-1, 602-2, 602-3, 602-4, and 602-5 forming the antenna element of FIG. 7A), wherein the plurality of conductive elements may form an antenna array, and wherein the at least one hole may include a plurality of holes (e.g., the plurality of holes 612-1, 612-2, 612-3, 612-4, 612-5 of FIG. 7A) corresponding one-to-one with the plurality of conductive elements.

According to an example embodiment, the second conductive member, the third conductive member, and the fourth conductive member may be configured as a director configured to transmit a signal radiated from the first conductive member.

According to an example embodiment, the director may include a plurality of directors, and wherein the plurality of directors may be arranged in each of the plurality of holes.

According to an example embodiment, an electronic device (e.g., the electronic device 500 of FIG. 6A) may comprise: a housing including a front plate, a rear plate facing in an opposite direction to the front plate, and a side bezel (e.g., the side bezel structure 518 of FIG. 6A) surrounding a space between the front plate and the rear plate, a hole (e.g., the hole 612 of FIG. 6A) formed at the side bezel, a non-conductive member (e.g., the non-conductive member 611 of FIG. 6A) comprising a non-conductive material filling the hole, an antenna module (e.g., the antenna module 600 of FIG. 6A) including a substrate (e.g., the substate 601 of FIG. 6A) disposed in the housing spaced apart from the hole, and a first conductive member (e.g., the first conductive member 602 of FIG. 6A) comprising a conductive material disposed on a surface of the substrate facing the hole, a second conductive member (e.g., the second conductive member 1401 and the third conductive member 1402 of FIG. 14A) comprising a conductive material facing the first conductive member and disposed at the non-conductive member, the second conductive member coupled to the first conductive member, and at least one processor, comprising processing circuitry, operably coupled to the first conductive member of the first conductive member and the second conductive member, wherein at least one processor, individually and/or collectively, may be configured to communicate with an external electronic device distinct from the electronic device, through the first conductive member and the second conductive member.

According to an example embodiment, the electronic device further comprises: a non-conductive member (e.g., the non-conductive member 611 of FIG. 6A) comprising a non-conductive material disposed in the at least one hole, and wherein the second conductive member may be disposed on a surface of the non-conductive member facing the first conductive member.

According to an example embodiment, the at least one hole may include a first edge extending in a first direction parallel to the first conductive member and a second edge extending in a second direction perpendicular to the first direction.

According to an example embodiment, the second conductive member may include a first area parallel to the first edge and a second area distinct from the first area, and wherein the first area and the second area may cross each other.

According to an example embodiment, a signal communicated by the at least one processor through the first conductive member may include a first polarization signal having a polarization characteristic in the first direction and a second polarization signal having a polarization characteristic in the second direction.

According to an example embodiment, the first polarization signal may communicate through a portion of the first area and the second area.

According to an example embodiment, the second polarization signal may communicate through the first area.

According to an example embodiment, a length of the first area may be less than a specified ratio of a wavelength of electromagnetic wave of the signal communicating through the first conductive member.

According to an example embodiment, the electronic device may further include: a third conductive member (e.g., the third conductive member 1421-2 of FIG. 14B) comprising a conductive material disposed in the non-conductive member and spaced apart from the first area in the first direction, and a fourth conductive member (e.g., the fourth conductive member 1421-3 of FIG. 14B) comprising a conductive material disposed in the non-conductive member and spaced apart from the first area in a direction opposite to the first direction.

According to an example embodiment, at least one processor, individually and/or collectively, may be configured to: communicate a signal of the first frequency band with an external electronic device distinct from the electronic device through the first conductive member and the second conductive member, and communicate a signal of the second frequency band lower than the first frequency band with an external electronic device distinct from the electronic device through the first conductive member, the second conductive member, the third conductive member coupled to the second conductive member, and the fourth conductive member coupled to the second conductive member.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of or all possible combinations of the items enumerated together in a corresponding one of the phrases. As used herein, such terms as “1st” and “2nd,” or “first” and “second” may be used to simply distinguish a corresponding component from another, and docs not limit the components in other aspect (e.g., importance or order). It is to be understood that if an element (e.g., a first element) is referred to, with or without the term “operatively” or “communicatively”, as “coupled with,” or “connected with” another element (e.g., a second element), the element may be coupled with the other element directly (e.g., wiredly), wirelessly, or via a third element.

As used in connection with various embodiments of the disclosure, the term “module” may include a unit implemented in hardware, software, or firmware, or any combination thereof, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the “non-transitory” storage medium is a tangible device, and may not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

No claim element is to be construed under the provisions of 35 U.S.C. § 112, sixth paragraph, unless the element is expressly recited using the phrase "means for" or "means."

What is claimed is:

1. An electronic device comprising:

a housing including:

a front plate;

a rear plate positioned opposite to the front plate; and a side bezel surrounding a space between the front plate and the rear plate;

at least one hole formed at the side bezel;

a non-conductive member comprising a non-conductive material disposed in the at least one hole;

an antenna module including:

a substrate disposed in the housing spaced apart from the at least one hole; and a first conductive member, comprising a first conductive material, disposed on a surface of the substrate facing the at least one hole, and configured to radiate a signal with a first polarization or a second polarization;

a second conductive member comprising a second conductive material facing the first conductive member and disposed at the non-conductive member, the second conductive member being parallel to a polarization direction of the first polarization and coupled to the first conductive member;

a third conductive member, comprising a third conductive material, disposed at the non-conductive member, and spaced apart from an end of the second conductive member;

a fourth conductive member comprising a fourth conductive material disposed at the non-conductive member and spaced apart from another end of the second conductive member;

at least one processor, comprising processing circuitry;

a memory including one or more storage media storing instructions, wherein the instructions, when executed by the at least one processor individually and/or collectively, cause the electronic device to:

communicate with an external electronic device, using a signal of a first frequency band, through the first conductive member and the second conductive member, and communicate with the external electronic device, using a signal of a second frequency band lower than the first frequency band, through the first conductive member, the second conductive member, the third conductive member coupled to the second conductive member, and the fourth conductive member coupled to the second conductive member.

2. The electronic device of claim 1, wherein a portion of the first conductive member overlaps the at least one hole when the at least one hole is viewed from the outside.

3. The electronic device of claim 1, wherein the second conductive member, the third conductive member, and the fourth conductive member are disposed on a surface of the non-conductive member facing the first conductive member.

4. The electronic device of claim 1, wherein the second conductive member, the third conductive member, and the fourth conductive member are disposed in the non- conductive member.

5. The electronic device of claim 1, wherein the at least one hole includes:

a first edge extending in a first direction parallel to the first conductive member, a second edge parallel to the first edge, a third edge extending from an end of the first edge to an end of the second edge, and a fourth edge extending from another end of the first edge to another end of the second edge, wherein a length of the third edge and a length of the fourth edge are less than a length of the first conductive member.

6. The electronic device of claim 5, wherein a length of the first edge and a length of the second edge are greater than the length of the first conductive member.

7. The electronic device of claim 5, further comprising:

a fifth conductive member, comprising a fifth conductive material, extending parallel to the third edge from each of the edges of the second conductive member that are parallel to the first edge;

a sixth conductive member, comprising a sixth conductive material, spaced apart from the fifth conductive member in a third direction perpendicular to the first direction; and a seventh conductive member, comprising a seventh conductive material, spaced apart from the fifth conductive member in a direction opposite to the third direction;

wherein the length of the first edge and the length of the second edge are less than the length of the first conductive member.

8. The electronic device of claim 7, wherein the instructions, when executed by the at least one processor individually and/or collectively, cause the electronic device to:

communicate with the external electronic device, using the signal of the first frequency band, through the first conductive member and the fifth conductive member, and communicate with the external electronic device, using the signal of the second frequency band lower than the first frequency band, through the first conductive member, the fifth conductive member, the sixth conductive member, and the seventh conductive member.

9. The electronic device of claim 7, wherein the signal of the first frequency band comprises a first polarization signal having a polarization characteristic in the first direction and a second polarization signal having a polarization characteristic in the third direction, wherein the electronic device is configured to communicate the first polarization signal through the fifth conductive member, and wherein the electronic device is configured to communicate the second polarization signal through the second conductive member.

10. The electronic device of claim 1, wherein a length of the second conductive member is less than a specified ratio of a wavelength of electromagnetic wave corresponding to the first frequency band guided within the at least one hole by the second conductive member.

11. The electronic device of claim 1, wherein a sum of lengths of the second conductive member, the third conductive member, and the fourth conductive member is less than a specified ratio of a wavelength of electromagnetic wave corresponding to the second frequency band guided within the at least one hole by the second conductive member.

12. The electronic device of claim 1, wherein the first conductive member includes a plurality of conductive elements comprising the first conductive material, wherein the plurality of conductive elements forms an antenna array, and wherein the at least one hole includes a plurality of holes corresponding one-to-one with the plurality of conductive elements.

13. The electronic device of claim 12, wherein the second conductive member, the third conductive member, and the fourth conductive member are configured to function as a director configured to transmit a signal radiated from the first conductive member.

14. The electronic device of claim 13, wherein the director includes a plurality of directors, and wherein the plurality of directors are arranged in each of the plurality of holes.

15. An electronic device comprising:

a housing including a side structure forming a lateral side of the electronic device, wherein a hole is formed at the side structure and the hole is filled with a non-conductive member;

an antenna module disposed in the housing, the antenna module including:

a substrate disposed in the housing and spaced apart from the hole, and an antenna element disposed on a surface of the substrate facing the hole;

a director disposed at the hole, wherein the antenna element is configured to radiate electromagnetic wave with a first polarization and a second polarization perpendicular to the first polarization, wherein a polarization direction of the first polarization is parallel to a thickness direction of the side structure, and wherein the director is parallel to the polarization direction of the first polarization to guide the first polarization into the hole.

16. The electronic device of claim 15, wherein the director includes:

a first conductive part facing the antenna element,, a second conductive part disposed at the non-conductive member, and spaced apart from an end of the first conductive part, a third conductive part disposed at the non-conductive member, and spaced apart from another end of the first conductive part.

17. The electronic device of claim 16, wherein the first conductive part, the second conductive part, and the third conductive part are disposed on a surface of the non-conductive member.

18. The electronic device of claim 16, further comprising:

at least one processor, comprising processing circuitry; and a memory including one or more storage media storing instructions, wherein the instructions, when executed by the at least one processor individually and/or collectively, cause the electronic device to:

communicate with an external electronic device, using a signal of a first frequency band, through the antenna element and the first conductive part, and communicate with the external electronic device, using a signal of a second frequency band lower than the first frequency band, through the antenna element, the first conductive part, the second conductive part, and the third conductive part.

19. The electronic device of claim 15, wherein a width of the hole which is parallel to the thickness direction corresponds to a half wavelength of the electromagnetic wave radiated from the antenna element.

20. The electronic device of claim 19, wherein a length of the hole which is parallel to the thickness direction shorter than the width of the hole.

* * * * *